United States Patent [19]

Bortnikov et al.

[11] Patent Number: 5,950,009
[45] Date of Patent: *Sep. 7, 1999

[54] METHOD AND APPARATUS FOR PROFILE-BASED REORDERING OF PROGRAM PORTIONS IN A COMPUTER PROGRAM

[75] Inventors: Vita Bortnikov; Bilha Mendelson, both of Haifa; Mark Novick, Jerusalem, all of Israel; William Jon Schmidt, Rochester, Minn.; Inbal Shavit-Lottem, Kibbutz Bet-Oren, Israel

[73] Assignee: International Business Machines Coporation, Armonk, N.Y.

[*] Notice: This patent is subject to a terminal disclaimer.

[21] Appl. No.: 08/814,527

[22] Filed: Mar. 10, 1997

[51] Int. Cl.⁶ .............................. G06F 9/445; G06F 9/45
[52] U.S. Cl. ........................... 395/709; 395/704; 714/38; 712/214; 712/241; 712/233
[58] Field of Search .................................... 395/709, 704, 395/183.14, 183.01, 390, 392, 380, 588, 580; 714/38, 37, 35; 712/214, 241, 233, 216, 204

[56] References Cited

U.S. PATENT DOCUMENTS

| | | | |
|---|---|---|---|
| 4,847,755 | 7/1989 | Morrison et al. | 364/200 |
| 4,914,590 | 4/1990 | Loatman et al. | 364/419 |

(List continued on next page.)

OTHER PUBLICATIONS

Balasa, F., et al., "Transformation of Nested Loops with Modulo Indexing to Affine Recurrences", *Parallel Processing Letters,* vol. 4, No. 3 (Sep. 1994), pp. 271–280.

Conte, T.M., et al., "Hardware–Based Profiling: An Effective Technique for Profile–Driven Optimization", *International Journal of Parallel Programming,* vol. 24, No. 2, Apr. 1996, pp. 187–206.

Conte, T.M., et al., "Using Branch Handling Hardware to Support Profile–Driven Optimization", *International Symposium on Microarchitecture,* 27th, Nov. 30–Dec. 2, 1994, pp. 12–21.

Kishon, A., et al., "Semantics Directed Program Execution Monitoring",*J. Functional Programming,* vol. 5, No. 4, Oct. 1995, pp. 501–547.

"Program Restructuring Technique for Improving Memory Management Performance", *IBM Technical Disclosure Bulletin,* vol. 39, No. 03, Mar. 1996, pp. 203–205.

(List continued on next page.)

*Primary Examiner*—Tariq R. Hafiz
*Assistant Examiner*—Tuan Q. Dam
*Attorney, Agent, or Firm*—Martin & Associates, L.L.C.; Derek P. Martin

[57] ABSTRACT

An apparatus and several methods provide for a more optimized computer program that will have a faster execution time than was possible using the prior art reordering technique that adds to a trace until it finds no more predecessors or successors to add. The apparatus and methods disclosed herein use a variety of methods to reorder the program portions in a more intelligent manner that will improve its run-time performance. Each of these methods involves constructing traces in the control flow graph of the computer program. In a first embodiment, a basic block is only added to a trace if it is not negligible within predetermined limits. This negligibility test results in traces that are not extended for infrequently executed basic blocks. In a second embodiment, a basic block is only added to a trace if it is a perfect partner with the last basic block added to the trace. The concept of a "perfect partner" helps to match basic blocks together in a trace that have the greatest affinity for each other. In a third embodiment, a basic block is only added to a trace if it satisfies "should follow" flags and predetermined negligibility criteria. The "should follow" flags and negligibility criteria provide a complex criteria for adding basic blocks to a trace, criteria that create more efficient code in some specific circumstances.

26 Claims, 15 Drawing Sheets

U.S. PATENT DOCUMENTS

| | | | |
|---|---|---|---|
| 4,947,315 | 8/1990 | Sokolow et al. | 364/200 |
| 5,014,185 | 5/1991 | Saito et al. | 364/188 |
| 5,021,945 | 6/1991 | Morrison et al. | 364/200 |
| 5,179,703 | 1/1993 | Evans | 395/700 |
| 5,193,180 | 3/1993 | Hastings | 395/575 |
| 5,212,794 | 5/1993 | Pettis et al. | 395/700 |
| 5,265,254 | 11/1993 | Blasciak et al. | 395/700 |
| 5,333,304 | 7/1994 | Christensen et al. | 395/575 |
| 5,335,344 | 8/1994 | Hastings | 395/575 |
| 5,355,487 | 10/1994 | Keller et al. | 395/650 |
| 5,412,799 | 5/1995 | Papadopoulos | 395/500 |
| 5,428,782 | 6/1995 | White | 395/650 |
| 5,428,793 | 6/1995 | Odnert et al. | 395/709 |
| 5,450,586 | 9/1995 | Kuzara et al. | 395/700 |
| 5,465,258 | 11/1995 | Adams | 395/700 |
| 5,485,616 | 1/1996 | Burke et al. | 395/709 |
| 5,517,628 | 5/1996 | Morrison et al. | 395/375 |
| 5,522,036 | 5/1996 | Shapiro | 395/183.14 |
| 5,535,329 | 7/1996 | Hastings | 395/183.11 |
| 5,539,907 | 7/1996 | Srivastava et al. | 395/700 |
| 5,555,417 | 9/1996 | Odnert et al. | 395/707 |
| 5,606,698 | 2/1997 | Powell | 395/709 |
| 5,689,712 | 11/1997 | Heisch | 395/704 |
| 5,787,284 | 7/1998 | Blainey et al. | 395/701 |
| 5,797,012 | 8/1998 | Blainey et al. | 395/705 |
| 5,797,013 | 8/1998 | Mahadevan et al. | 395/709 |
| 5,812,854 | 9/1998 | Steinmetz et al. | 395/709 |

OTHER PUBLICATIONS

"Statistics Gathering and Analyzing Tool for Open Software Foundation's Distributed Computing Environment", *IBM Technical Disclosure Bulletin,* vol. 37, No. 02B, Feb. 1994, pp. 215–217.

Youfeng, W, et al., "Static Branch Frequency and Program Profile Analysis", *International Symposium on Microarchitecture,* 27th, Nov. 30–Dec. 2, 1994, pp. 1–11.

Speer, Steven E., et al., "Improving UNIX Kernel Performance using Profile Based Optimization", *1994 Winter USENIX,* Jan. 17–21, 1994, pp. 181–188.

Pettis and Hansen, "Profile Guarded Code Positioning", *Proceedings of the ACM SIGPLAN '90 Conference on Programming Language Design and Implementation,* Jun. 20–22, 1990, pp. 16–27.

Hank et al, "Region–based compilation: an introduction and motivation," MICRO 28, Proceedings of the 28th Annual International Symposium on Microarchitecture, pp. 158–168, Dec. 1995.

Eichenberger et al, "Stage Scheduling: A Technique to Reduce the Register Requirements of a Modulo Schedule," MICRO 28, Proceedings of the 28th Annual International Symposium on Microarchitecture, pp. 338–349, Dec. 1995.

METHOD AND APPARATUS FOR PROFILE-BASED REORDERING OF PROGRAM PORTIONS IN A COMPUTER PROGRAM

RELATED APPLICATIONS

This application is related to the following co-pending patent applications: "Method and Apparatus for Modular Reordering of Portions of a Computer Program Based on Profile Data", Ser. No. 08/819,526, filed Mar. 17, 1997; and "Method and Apparatus for Reordering Procedures in a Computer Program Based on Profile Data", Ser. No. 08/820,735, filed Mar. 19, 1997.

BACKGROUND OF THE INVENTION

1. Technical Field

This invention generally relates to the optimization of computer programs, and more specifically relates to a computer apparatus and method for determining the order of program portions in a computer program.

2. Background Art

The development of the EDVAC computer system in 1948 is generally considered the beginning of the computer era. Since that time, dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. Branch instructions are one type of instruction that may affect the execution time of a computer program. A branch instruction may cause the processor to go (i.e., branch) to a different part of the computer program to execute instructions. If a computer program contains many branch instructions, the time spent branching from one portion of the program to the next may introduce delays. Judicious selection of the order of portions of the computer program may improve the program's execution time by placing portions that are executed sequentially in sequential order.

In order to optimize the performance of modern computer programs, profilers have been developed to predict and/or measure the run-time performance of a computer program. Profilers typically generate profile data that estimates how often different portions of the computer program are executed. Using profile data, an optimizer (such as an optimizing compiler) may make decisions regarding the preferred order of different portions of the computer program in order to optimize the execution speed of the computer program.

Known prior art systems generate profile data that is used by a compiler to determine the order of portions of a computer program. However, the known methods for using profile data in reordering portions of a computer program do not provide an optimal solution. Prior art methods may still yield inefficiencies in the structure of the code, such as taking branches along the most frequently executed path, that result in a slower execution time for the computer program. Without improved apparatus and methods for reordering portions of a computer program based on profile data, the performance of the computer program will be less optimized.

DISCLOSURE OF INVENTION

According to the present invention, an apparatus and several methods provide for a more optimized computer program that will have a faster execution time than was possible using the prior art reordering technique that adds to a trace until it finds no more predecessors or successors to add. The apparatus and methods disclosed herein use a variety of methods to reorder the program portions in a more intelligent manner that will improve its run-time performance. Each of these methods involves constructing traces in the control flow graph of the computer program. In a first embodiment, a basic block is only added to a trace if it is not negligible within predetermined limits. This negligibility test results in traces that are not extended for infrequently executed basic blocks. In a second embodiment, a basic block is only added to a trace if it is a perfect partner with the last basic block added to the trace. The concept of a "perfect partner" helps to match basic blocks together in a trace that have the greatest affinity for each other. In a third embodiment, a basic block is only added to a trace if it satisfies "should follow" flags and predetermined negligibility criteria. The "should follow" flags and negligibility criteria provide a complex criteria for adding basic blocks to a trace, criteria that create more efficient code in some specific circumstances.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
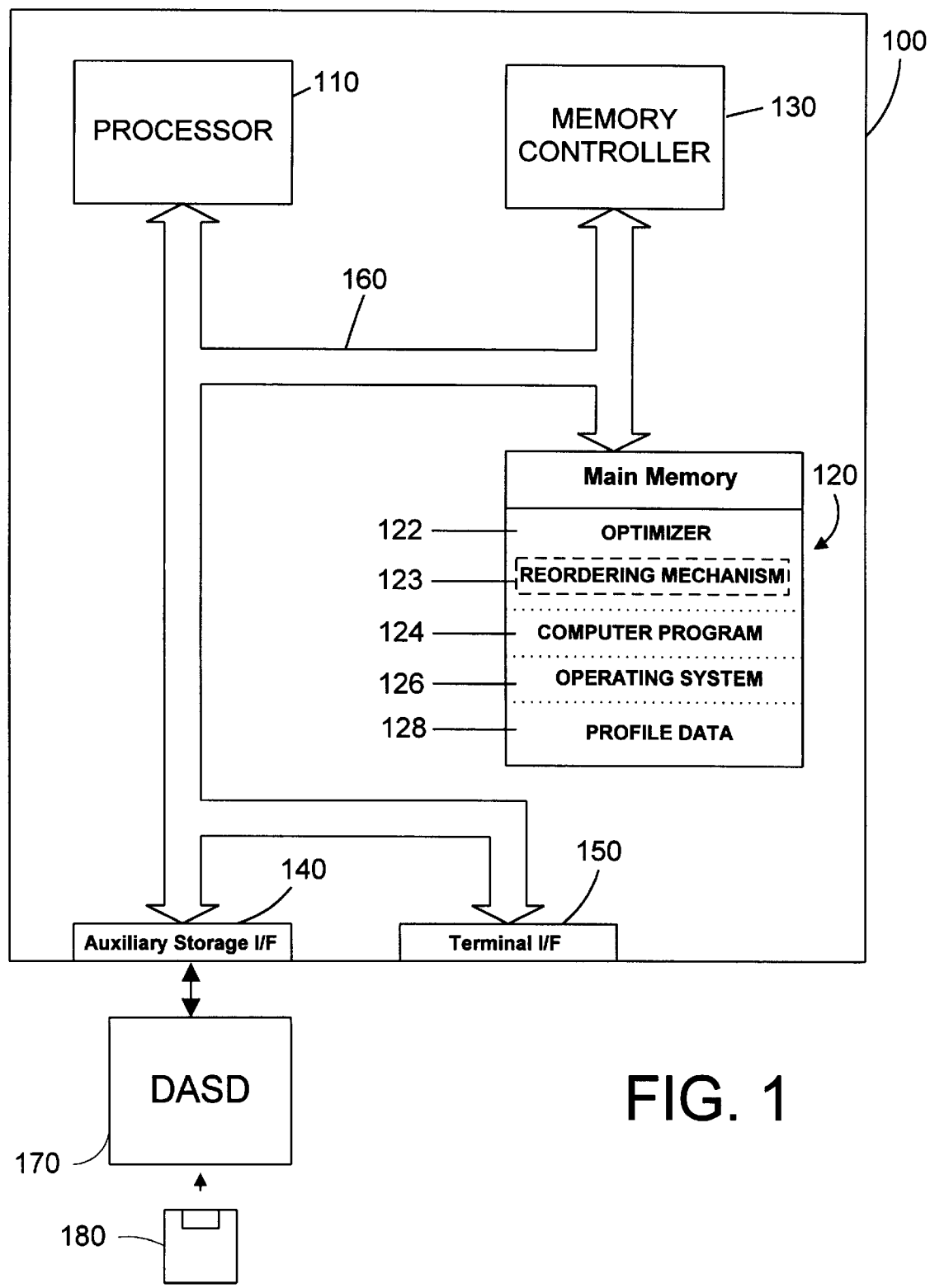
FIG. 1 is a block diagram of a computer apparatus in accordance with the present invention.

The present invention relates to optimization of a computer program using profile data. For those that are not experts in the field, the Overview section below provides general background information that will be helpful in understanding the concepts of the invention.

Overview

Optimizations Using Profile Data

Many modern software development environments include a profiling mechanism that uses information collected about a program's run-time behavior (known as profile data) to improve optimization of that program. "Profile data" as used herein means any estimates of execution frequencies in a computer program, regardless of how the estimates are generated. Profile data may be generated in a number of different ways. One way of generating profile data is to perform a static analysis on the program code to estimate the execution frequency of blocks in the computer program. Other methods are known that dynamically collect information about a computer program as it runs. One type of dynamic profiler is known as a sampling profiler. A sampling profiler uses a hardware timer to periodically wake up a process that records the address of the currently executing instruction. While sampling profilers can be adequate for recording which procedures are executed frequently, they generally do not work well for recording lower-level information, such as the frequency that a certain branch in the computer program is taken.

A second type of dynamic profiler is known as a trace-based profiler, which collects an execution trace of all the instructions executed by the computer program. An execution trace is a map that shows the addresses that were encountered during program execution. The profiler then reduces this information to a manageable size to determine how often each branch in the program was taken and not taken.

A third type of dynamic profiler is known as an instrumenting profiler. An instrumenting profiler recompiles the computer program and inserts special instrumentation code known as "hooks" at important branch points in the computer program. As the instrumented program executes, these hooks cause data counters to be incremented, recording the branch history information directly as the computer program runs. The counters contain profile data that is then used to determine how often each branch in the computer program was taken.

Basic Block Reordering

Modern compilers typically group instructions into groups known as "basic blocks". The term "basic block" is well known in the art, and represents a maximal sequence of straight-line code. One important profile-based optimization is basic block reordering, which analyzes the most frequently executed paths within each procedure in a computer program, and uses this information to reorder the basic blocks within the procedure being compiled. The primary purpose of this reordering is to improve instruction cache performance and instruction prefetch performance.

The performance of the instruction cache can be improved by rearranging code within a procedure so that the most frequently executed paths are arranged sequentially. This reduces the number of instructions that are fetched into the instruction cache but not executed (called "cache pollution") by decreasing the number of unused instructions present in each cache line. On many systems, basic block reordering also improves the performance of the hardware's instruction prefetch mechanism.

Effectively reordering basic blocks requires an understanding of control flow graphs. A control flow graph (CFG) for a procedure is a directed graph consisting of one node for each basic block in that procedure. There is an arc in the CFG between block A and block B if it is possible for block B to be executed immediately following an execution of block A. In such a case, A is said to be a predecessor of B, B is said to be a successor of A, and the arc A-B is said to be incident to blocks A and B. A path in a CFG is a sequence of such arcs describing a possible sequence of basic block executions. For convenience, we assume that all blocks in the CFG can be reached by at least one path from the procedure's entry point.

A control flow graph can be "weighted" with estimates of execution frequencies. These estimates are often obtained using profile data from sample executions of the procedure, but other methods of estimating execution frequencies are possible. For example, some compilers try to provide rough estimates by static analysis of the control flow graph. Such static methods for generating profile data are generally not as accurate as those obtained by dynamic profiling, but can be generated without the overhead of dynamic profiling. Once profile data is generated, weights may be assigned to basic blocks or to the arcs between them. A weight given to an arc between two basic blocks A and B indicates how frequently control is expected to pass from block A to block B, compared with other arcs in the procedure. A weight given to a basic block indicates how frequently that block is expected to be executed, compared with other basic blocks in the procedure. In other words, the weight of a basic block is the sum of the weights of all arcs that lead to the basic block.

One known method for reordering basic blocks in a computer program based on profile data is disclosed in U.S. Pat. No. 5,212,794 "Method for Optimizing Computer Code to Provide More Efficient Execution on Computers Having Cache Memories", issued May 18, 1993 to Pettis et al. and assigned to Hewlett-Packard Co. The applicable method is described in column 6, line 64, through column 7, line 17 of the Pettis et al. patent. The Pettis et al. method uses a "greedy" approach to reorder portions of the computer program, as described in more detail below.

The greedy approach for reordering basic blocks within a procedure operates by constructing a series of "chains" of basic blocks, referred to herein as "traces". Each trace consists of a sequence of basic blocks that can be executed in sequence. In other words, a trace corresponds to an acyclic path in the procedure's CFG. The procedure's basic blocks are reordered according to the traces, so that all blocks in the first trace are placed in the order they appear in that trace; then all blocks in the second trace are placed in the order they appear in that trace; and so forth until all basic blocks in the procedure have been reordered. The term "unreordered", as used in this specification, needs to be defined to understand the prior art method and to understand the benefits and advantages of the present invention. An unreordered basic block is a basic block in the computer program that has not been added to any trace. Once a basic block has been put into a trace, its ordering in the computer program is defined, and it is therefore reordered (i.e., not "unreordered"). Thus, when a method step adds unreordered basic blocks to a trace, it is selecting from all the blocks that are currently unassigned to any trace.

Figure 2:
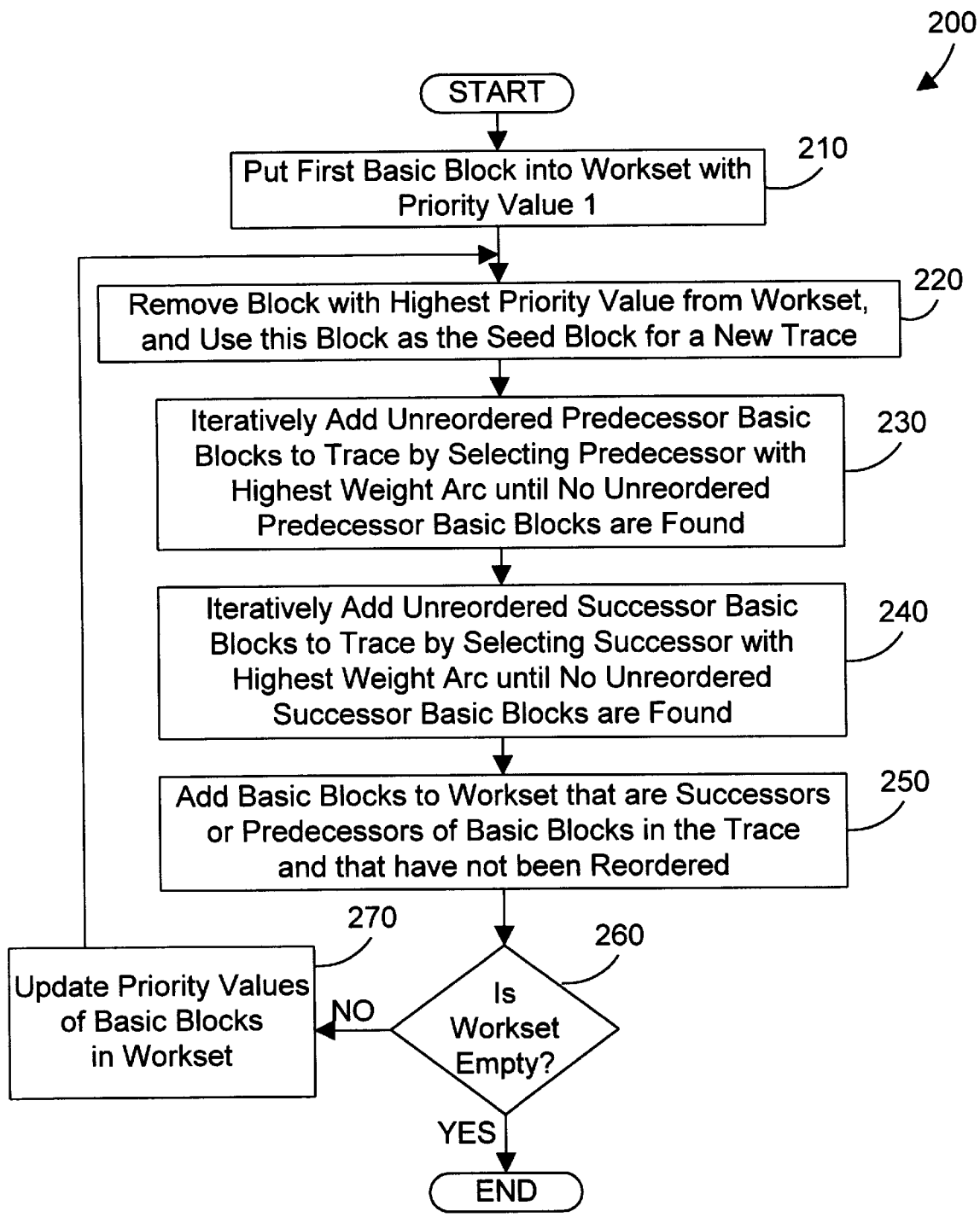
FIG. 2 is a flow diagram of a specific implementation of a known method of reordering program portions in a computer program.

One specific implementation of the greedy approach taught in the Pettis et al. patent is shown as method 200 in FIG. 2. Method 200 as shown in FIG. 2 reorders basic blocks within a procedure in a way that achieves similar results to the prior art method disclosed in the Pettis et al. patent, but is not, in and of itself, prior art. Method 200 uses some concepts (such as "workset", "seed block", and "priority value") that are not disclosed in Pettis et al.. Method 200 of FIG. 2 is shown for the purpose of illustrating the advantages of the present invention compared to orderings that result from application of method 200 that achieves the ordering of the prior art. Basic blocks are illustrated as the applicable program portion to reorder for the purpose of illustrating the concepts of the invention. The concepts discussed herein with reference to both the prior art method and the methods according to the various embodiments require defining some terms. A "workset" is a container that may hold basic blocks of interest. When a block is added to a trace (i.e., reordered), it is removed from the workset and also removed from the group of blocks that are candidates for reordering. A "seed block" is a block that is removed from the workset to start a new trace. A "priority value" is assigned to blocks in the workset to determine which block will be selected as the next seed block. The priority value of a block is the sum of the weights of all arcs touching that block that also touch reordered blocks. The "current block" is the last block selected to extend the trace in one direction or the other. With these terms in mind, method 200 that achieves the ordering of the prior art will now be described.

At the beginning of method 200, the first step is to put the first basic block into the workset, assigning it a priority value of 1 (step 210). Next, a new trace is established by selecting and removing from the workset the block with the highest priority value (step 220). This block is the "seed block" of the new trace. Because only the first basic block was put into the workset in step 210, there is only one basic block in the workset to select in step 220. Thus, the first basic block becomes the seed block of a new trace in step 220.

Once the first basic block is put into the trace (step 220), method 200 iteratively adds unreordered predecessor basic blocks to the trace by selecting the predecessor of the block in the trace with the highest weight arc (step 230). For the first pass through method 200, the basic block in the trace is the first basic block in the computer program, and will have no predecessors. Thus, on the first pass, step 230 adds no basic blocks to the trace.

The next step 240 iteratively adds unreordered successor basic blocks to the trace by selecting the successor block of the first basic block that has the highest weight arc and adding it to the trace. Step 240 then iterates to look at the successors of the block that was just added, and adds the successor that has the highest weight arc to the trace. Step 240 continues until there are no more successor basic blocks that may be added to the trace. In this sense, method 200 is "greedy"—by adding basic blocks to the trace in both directions until no more basic blocks are available to add to the trace.

Once the last successor block has been added to the trace (step 240), the trace is examined, and all basic blocks that are successors or predecessors of basic blocks in the trace and that have not been reordered are added to the workset (step 250). At this point, method 200 determines if the workset is empty (step 260). If the workset is not empty (step 260=NO), new priority values are assigned to each block in the workset (step 270). As explained above, the priority value for a basic block is the sum of the weights of those arcs that are incident to B and are also incident to a block that has already been reordered. Method 200 then returns to step 220 to begin a new trace. Once all basic blocks have been reordered (i.e., put into a trace), the workset will be empty (step 260=YES), and method 200 ends.

Figure 3:
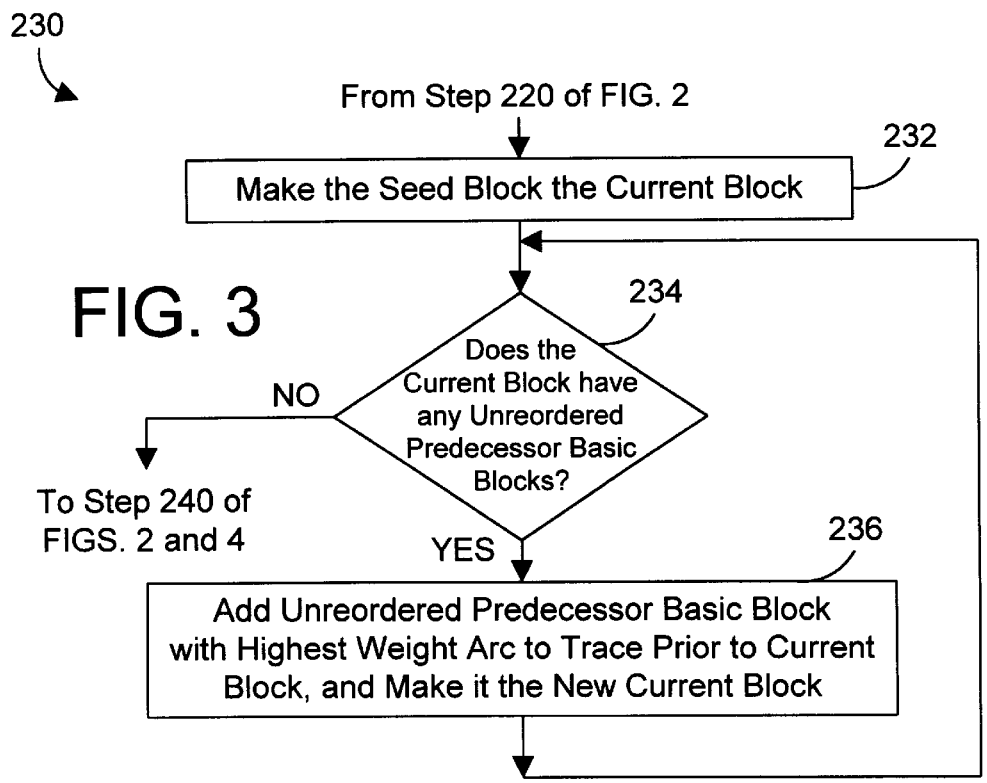
FIG. 3 is a flow diagram showing one detailed implementation of step 230 of FIG. 2.

One possible detailed implementation of step 230 of FIG. 2 is shown in FIG. 3. This implementation uses the concept of the "current block", which is usually the last block that has been added to the trace. At first, the current block is set to be the seed block (step 232). If the current block has no unreordered predecessor basic blocks (step 234=NO), step 230 is complete, and method 200 proceeds to step 240. If, however, the current block has at least one unreordered predecessor basic block (step 234=YES), its predecessor basic block with the highest weight arc connecting it to the current block is added to the trace (step 236). Step 230 in FIG. 3 graphically illustrates the greedy nature of method 200. So long as there remain unreordered predecessor basic blocks, these are added to the trace.

Figure 4:
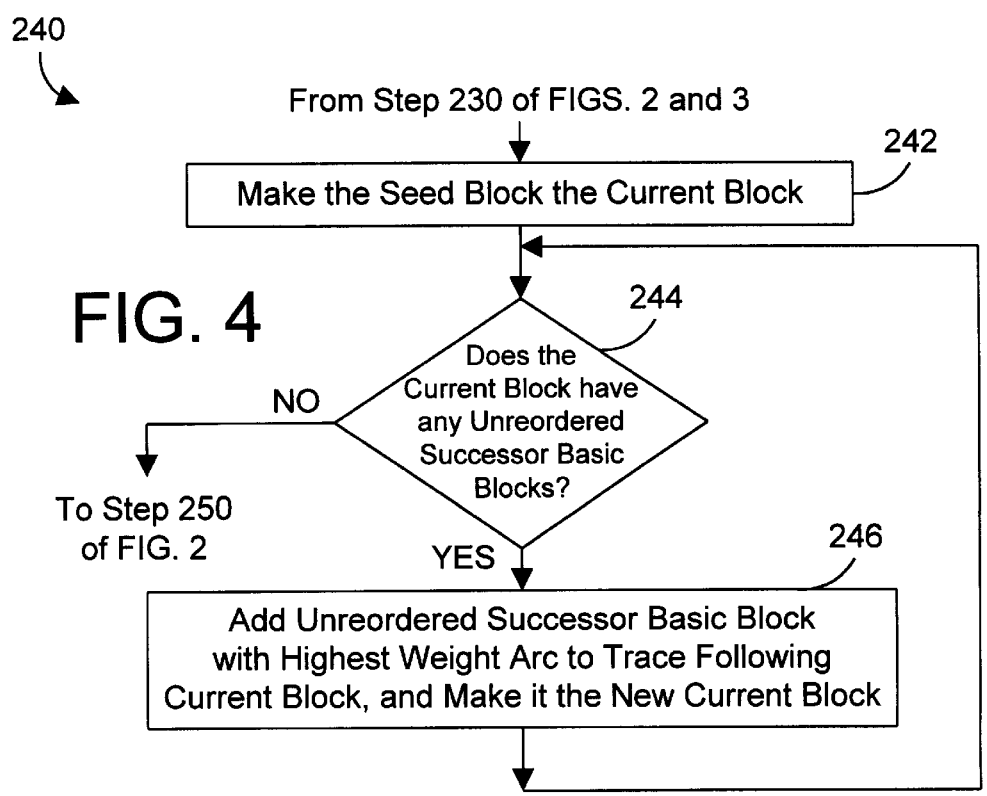
FIG. 4 is a flow diagram showing one detailed implementation of step 240 of FIG. 2.

One possible detailed implementation of step 240 of FIG. 2 is shown in FIG. 4. Step 240 of FIG. 4 is very similar to step 230 of FIG. 3, except that step 240 operates on unreordered successor basic blocks instead of unreordered predecessor basic blocks. Step 230 extends the trace upward as far as it can go, while step 240 extends the trace downward as far as it can go, to obtain a trace that is as long as possible before considering other basic blocks in the computer program.

Figure 14:
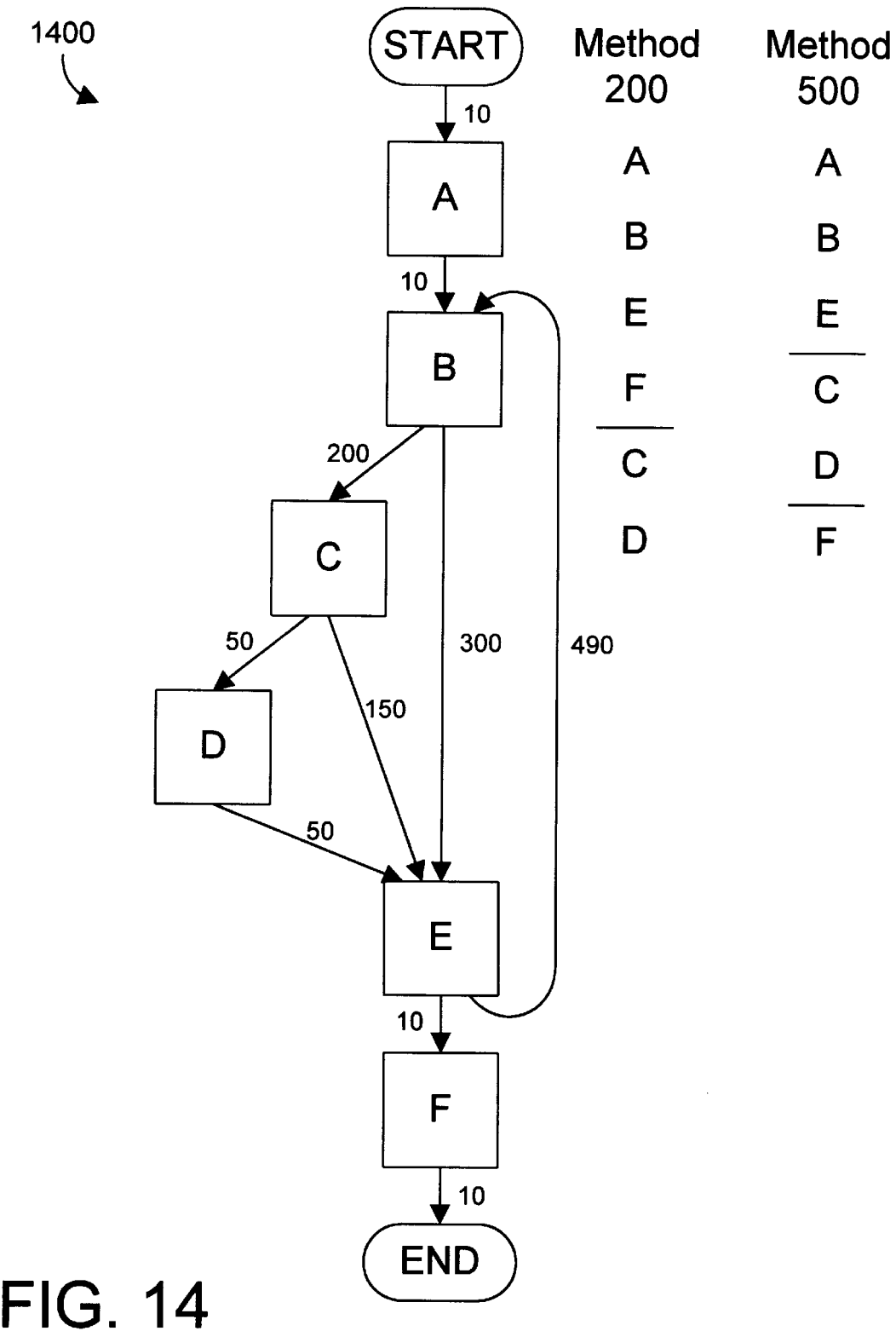
FIG. 14 is a flow diagram of a sample program used to illustrate the differences between the known method of FIG. 2 and the method in accordance with the first embodiment of FIG. 5.

One small sample program 1400 is shown in FIG. 14. Referring to FIGS. 2–4, when method 200 is applied to sample program 1400 (FIG. 14), step 210 puts block A into the workset, and step 220 removes block A from the workset and makes block A the seed block for a new trace. In step 230 (FIG. 3), block A is made the current block (step 232). There are no unreordered predecessor basic blocks to block A (because block A is the first block in sample program 1400) (step 234=NO), so no blocks are added to the trace in step 230. In step 240 (FIG. 4), block A is again made the current block (step 242). There is one unreordered successor basic block (block B), so step 244 is YES, and block B is added to the trace and becomes the current block (step 246). There are two unreordered basic blocks that are successors to B (blocks C and E), so step 244 is YES, and the block with the highest weight arc (block E) is added to the trace and becomes the current block (step 246). Block E has one unreordered basic block that is a successor (block F), so step 244 is YES, and block F is added to the trace and becomes the current block (step 246). At this point, block F has no unreordered successor blocks, so step 244 is NO, and step 240 is complete.

Step 250 (FIG. 2) then adds all unreordered basic blocks to the workset that are successors or predecessors of basic blocks in the trace that was just constructed. At this point the trace is A-B-E-F. Block C is a successor to a reordered block (block B), and block D is a predecessor of a reordered block (block E), so blocks C and D are added to the workset in step 250, and the workset is therefore not empty (step 260=NO). In step 270, the sum of the arcs that are incident to C and to blocks in the trace (200+150=350) becomes the assigned priority value for block C, and the new assigned priority value for block D is 50. Method 200 now returns to step 220 to construct a new trace.

Step 220 takes the block from the workset with the highest priority value, in this case, block C, and makes it a seed block in a new trace. In step 230, there are no unreordered predecessor basic blocks to block C (step 234=NO), because block B is the only predecessor, and block B has already been reordered in the previous trace. So no block is added to the new trace in step 230. In step 240, there is one unreordered successor basic block to block C, namely block D (step 244=YES). Block D is added to the trace after block C (step 246). At this point, there are no more unreordered successor basic blocks (step 244=NO), so step 240 is complete. Step 250 does not add any blocks to the workset because there are no more unreordered basic blocks. As a result, the workset is empty (step 260=YES), and method 200 ends, indicating that the reordering of basic blocks in sample program 1400 is complete. The resultant block order is shown in FIG. 14 under the column Method 200: A-B-E-F-C-D, with the various traces separated by horizontal lines.

For the reasons discussed below, reordering basic blocks within a computer program using method 200 to achieve the same ordering as known prior art methods may result in inefficiencies in the computer program that hinder its performance. The remainder of this specification discloses an apparatus and various methods for reordering portions of a computer program to result in an ordering of the portions that will yield a computer program with higher performance than the computer program that results from reordering according to method 200.

Detailed Description

Profile data may be generated in any of the methods discussed above, or may be generated by new methods in the future. The present invention uses profile data to reorder program portions within a computer program, without regard to how the profile data was generated.

While the preferred embodiments are discussed below in reference to reordering basic blocks within a procedure, basic blocks are shown as one illustration of a suitable program portion that may be reordered using the apparatus and method in accordance with the present invention. The invention disclosed herein extends to the reordering of any program portions within a computer program, whatever the granularity of the program portions with respect to the computer program as a whole.

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes a computer program 124 within main memory 120.

Auxiliary storage interface 140 is used to allow computer system 100 to store and retrieve information from auxiliary storage, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. Note that an optimizer 122 in accordance with the present invention may exist as a program product on one or more floppy disks 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links.

Memory controller 130, through use of a processor separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bidirectional communication could be used.

Main memory 120 contains an optimizer 122, one or more computer programs 124, operating system 126, and profile data 128. Optimizer 122 includes a reordering mechanism 123 that reorders portions of computer program 124. In the preferred embodiment, optimizer 122 is part of an optimizing compiler, but an optimizer 122 that is not part of any compiler is also anticipated. Computer program 124 in memory 120 is used in its broadest sense, and includes any and all forms of computer programs, including source code, intermediate code, machine code, and any other representation of a computer program that has portions that could be reordered. Profile data 128 includes estimates of execution frequencies of different portions of computer program 124. Profile data 128 may be generated using static analysis, dynamic profiling, or any other method for estimating execution frequencies for one or more portions of computer program 124. Once generated, profile data 128 is stored in main memory 120.

It should be understood that main memory 120 will not necessarily contain all parts of all mechanisms shown. For example, portions of computer program 124 and operating system 126 may be loaded into an instruction cache (not shown) for processor 110 to execute, while other files may well be stored on magnetic or optical disk storage devices (not shown). In addition, if optimizer 122 is part of an optimizing compiler, the compiler may generate a machine code instruction stream from computer program 124 that is intended to be executed on a different computer system if the optimizing compiler is a cross-compiler.

The remainder of this specification describes how methods in accordance with the present invention improve the performance of computer system 100 by reordering portions of a computer program 124 according to profile data 128 that characterizes the operation of the computer program. Those skilled in the art will appreciate that the present invention applies equally to any optimizer and to any method for generating profile data 128.

Figure 5:
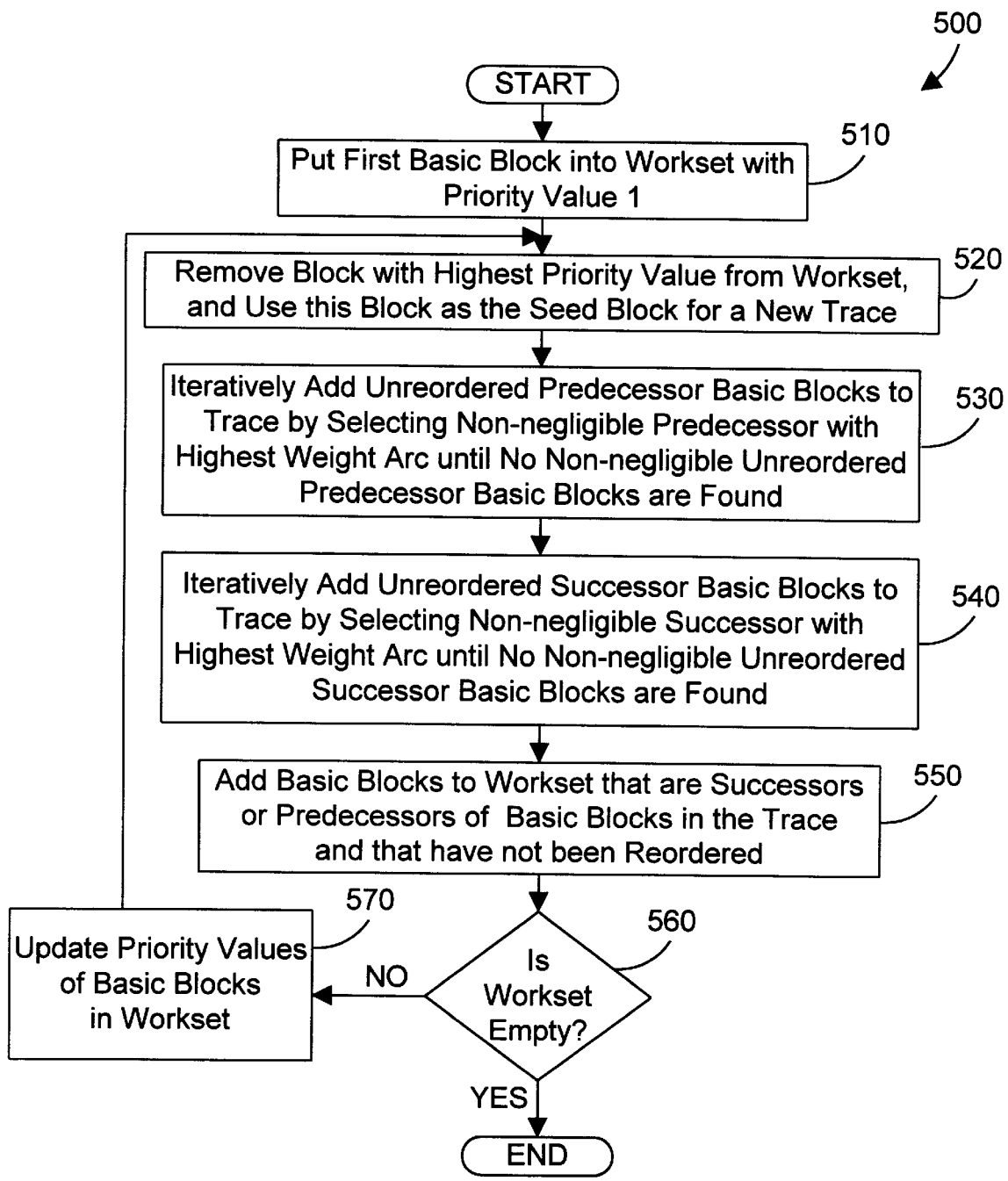
FIG. 5 is a flow diagram of a method in accordance with a first embodiment of the invention.

Referring to FIG. 5, method 500 in accordance with the first embodiment includes steps 510, 520, 550, 560, and 570 that are preferably analogous to steps 210, 220, 250, 260, and 270, respectively, of method 200 in FIG. 2. However, these steps may be modified within the scope of the present invention to perform different or additional functions in alternative embodiments. In the first preferred embodiment, the first basic block is put into the workset (step 510) and then assigned as the seed block for a new trace (step 520). However, the "greediness" of the method is limited in steps 530 and 540. In step 530, unreordered predecessor basic blocks are added to the trace unless the block weight of the unreordered predecessor compared to the block weight of the current block in the trace is negligible within predetermined limits. Note that block weights (i.e., execution frequencies of basic blocks) are compared in this step, not arc weights. Other methods of comparison are possible within the spirit and scope of the present invention. In step 540, unreordered successor basic blocks are added to the trace unless the block weight of the unreordered successor compared to the block weight of the current block in the trace is negligible within predetermined limits.

The concept of negligibility may be defined in any suitable manner. In the preferred embodiment, a candidate block being considered for addition to a trace is negligible with respect to the current block if the execution frequency (i.e., block weight) of the candidate is less than a predetermined fraction of the execution frequency of the current block. In the alternative, negligibility might be based upon arc weights along the proposed trace rather than block weights. Many other measures of negligibility are possible. Regardless of how negligibility is defined or implemented, the method 500 is distinguishable from method 200 in that the greediness of method 500 is limited according to whether or not the candidate block is considered negligible in comparison with the current block in the trace.

Figure 6:
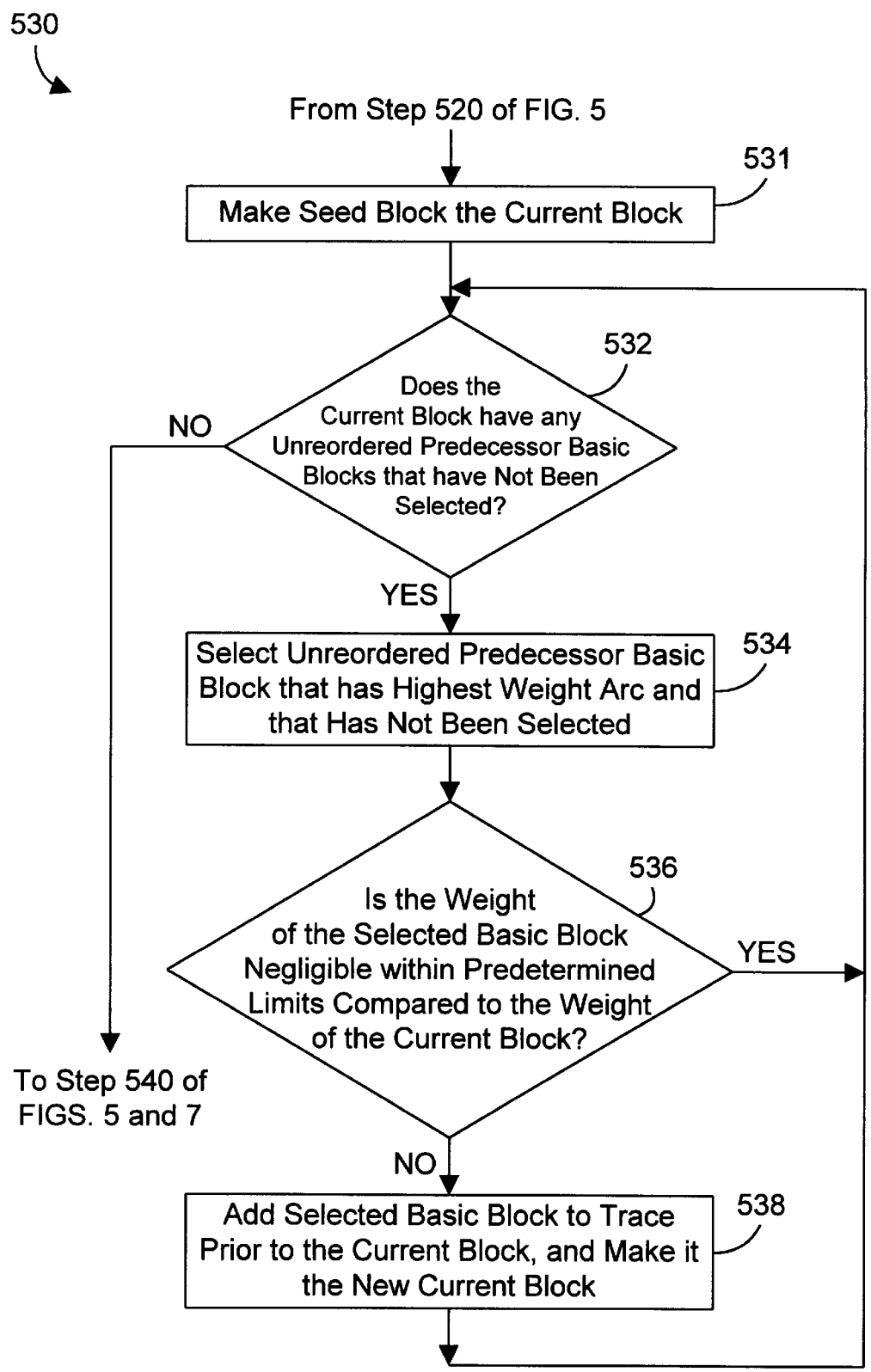
FIG. 6 is a flow diagram showing one detailed implementation of step 530 of FIG. 5.

Referring again to FIG. 5, step 530 iteratively adds unreordered predecessor basic blocks to the trace by selecting the predecessor with the highest weight arc that is non-negligible, rather than selecting the predecessor with the highest weight arc from among all predecessors. One suitable implementation of step 530 is shown in FIG. 6. As before, the current block is initially set to be the seed block (step 531). If the current block has any unreordered predecessor basic blocks that have not been selected in step 534 as a predecessor to this basic block (step 532=YES), the basic block is selected (step 534) that has the highest weight arc and that has not been previously selected as a predecessor to the current block. Step 536 then determines if the selected basic block is negligible within predetermined limits compared to the current block. If the selected basic block is not negligible (step 536=NO), the selected basic block is added to the trace and becomes the new current block (step 538). If the selected basic block is negligible (step 536=YES), the selected basic block is not added to the trace, and step 530 returns to step 532 to determine if further processing is required. Once all unreordered predecessors of the current block have been selected (step 532=NO), step 530 is complete, and method 500 proceeds to step 540.

Figure 7:
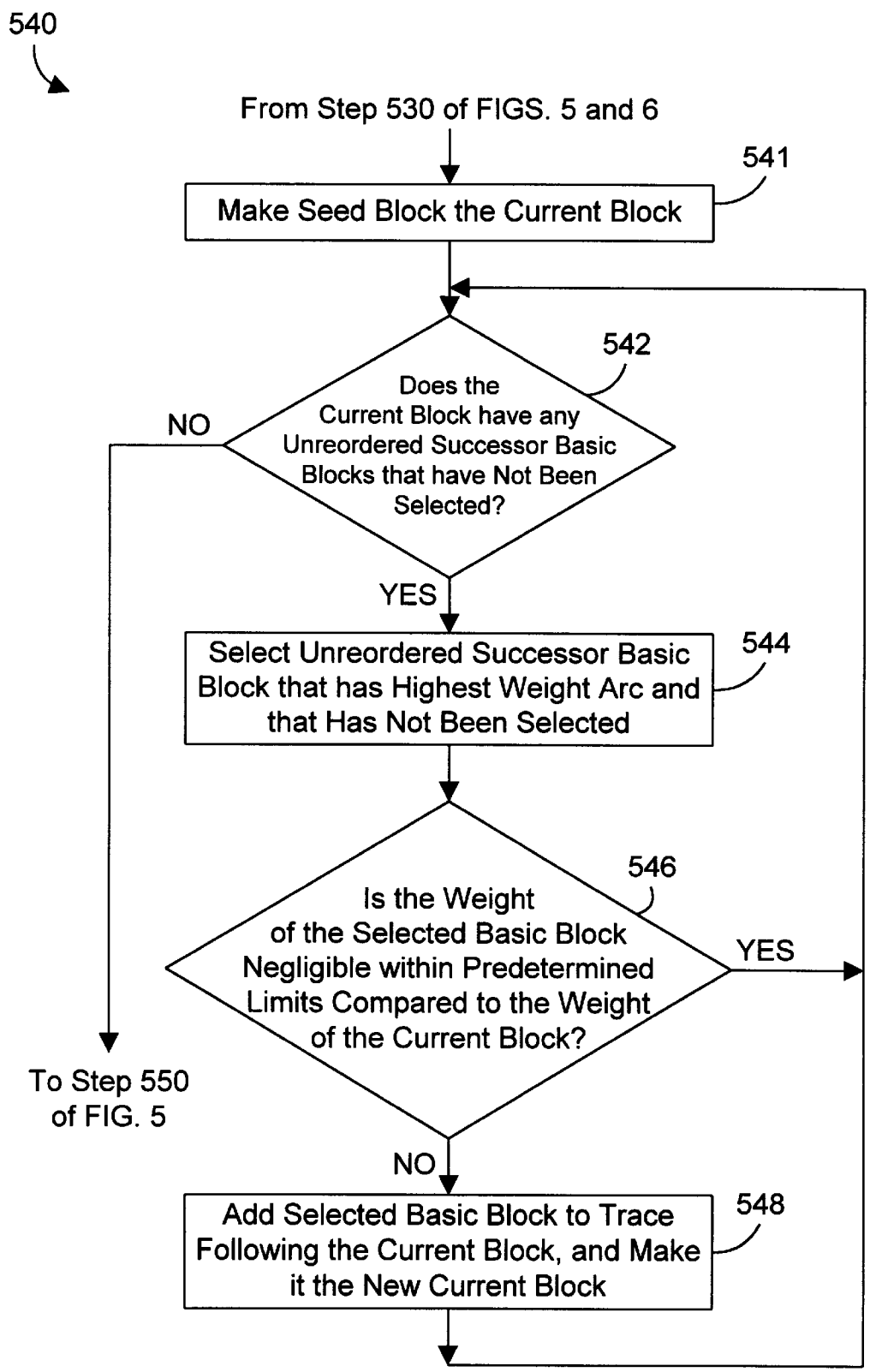
FIG. 7 is a flow diagram showing one detailed implementation of step 540 of FIG.5.

One detailed implementation for step 540 is illustrated in FIG. 7. Step 540 is very similar to step 530, with the primary difference being that step 540 operates on successor basic blocks while step 530 operates on predecessor basic blocks.

Referring now to FIG. 14, when method 500 is applied to the sample program 1400, a different reordering of basic blocks is achieved. Referring to FIGS. 5–7, the first step is to put the first basic block (block A) into the workset (step 510). Next, the block with the highest priority value (block A) is taken from the workset and assigned as the seed block for a new trace (step 520). In step 530 (FIG. 6), block A becomes the current block (step 531). At this point, there are no unreordered predecessor basic blocks (step 532=NO) because block A is the first block in sample program 1400, so step 530 adds nothing to the trace, and method 500 proceeds to step 540 (FIG. 7).

In step 540, block A is again made the current block (step 541). There is one unreordered successor basic block (block B) that has not been selected as a successor to block A (step 542=YES), so block B is selected (step 544). Next, step 546 determines whether the execution frequency of the selected basic block (block B) is negligible within predetermined limits compared to the execution frequency of block A. For this example, let's assume that the predetermined limits are defined so that a weight of an unreordered successor basic block is negligible if it is less than or equal to ten percent of the weight of the current block. For sample program 1400, the execution frequency of block B is 500, and the execution frequency of block A is 10. Since B's frequency is actually greater than A's, B is not negligible compared to A (step 546=NO), so block B is added to the trace and becomes the current block (step 548). Next, step 542 determines that there are still unreordered basic blocks (namely, C and E) that have not been selected in step 544 as a successor to block B (step 542=YES). The block with the highest weight arc (block E) is selected (step 544). Next, step 546 determines whether E is negligible compared to B. Both blocks have an execution frequency of 500, so E is not negligible compared to B (step 546=NO), and block E is added to the trace and becomes the current block (step 548).

Step 542 then determines if there are any unreordered successor basic blocks for block E. In sample program 1400, block F is an unreordered successor basic block for block E that has not been previously selected as a successor to block E. So block F is selected (step 544). The execution frequency for F (10) is less than ten percent of the execution frequency for E (500), so F is negligible compared to E (step 546=YES). As a result, F is not added to this trace. Method 500 then returns to step 542 to determine whether there are any more unreordered successor basic blocks to process.

Step 542 next determines that there are no more unreordered successor basic blocks that have not been selected (because F was previously selected), so method 500 then proceeds to step 550 of FIG. 5. Step 550 adds blocks C, D and F to the workset (step 550) because all are successors or predecessors to basic blocks that have not been reordered. As a result, the workset is not empty (step 560=NO). Step 570 assigns priority values as follows: C=350, D=50, F=10. Step 520 then assigns the block with the highest priority value from the workset (block C) as the seed block for a new trace. In step 531, block C becomes the current block. Step 532 determines that there are no unreordered predecessor basic blocks to block C, because block B has already been reordered (step 532=NO), so method 500 proceeds to step 540. Again, block C is assigned as the current block (step 541). Step 542 determines that there is one unreordered successor block (block D) that has not been selected (step 542=YES). Block D is then selected (step 544). Step 546 then tests whether block D has a negligible weight compared to the weight of block C. In this case, the execution frequency of 50 (i.e., block weight) for block D is 25% of the execution frequency of 200 for block C, so it is not negligible (step 546=NO). As a result, block D is added to the trace and becomes the current block (step 548). Next, step 542 determines that block D has no unreordered successor basic blocks that have not been selected (step 542=NO), so method 500 proceeds to step 550 (FIG. 5).

No more unreordered predecessors or successors are available to put in the workset, so step 550 does not add any basic blocks to the workset. However, the workset is not empty (step 560=NO) since F is still in the workset. Block F's priority value remains 10 (step 570). Block F is selected as the seed block for a new trace (step 520). There are no unreordered predecessors of F, so step 530 proceeds to step 540. There are no unreordered successors of F, so step 540 proceeds to step 550. There are no more remaining unreordered basic blocks, so none can be added to the workset in step 550. At this point the workset is empty (step 560=YES), and method 500 ends. The resultant block order, as shown in the column labeled Method 500 in FIG. 14, is A-B-E-C-D-F, with the various traces separated by horizontal lines.

Method 500 in accordance with the first embodiment reorders the basic blocks in a computer program in a more efficient way than reordering method 200 that produces an ordering known in the prior art. Specifically, method 500 makes a decision whether each potential block to be added to the trace has a negligible weight compared to the weight of a block already in the trace (i.e., the current block). In this manner, basic blocks that are executed more often are in closer proximity to each other, increasing the likelihood that the instructions in these basic blocks will be in the instruction cache at the same time, thereby reducing cache pollution and enhancing system performance. For the small sample program 1400 of FIG. 14, the change in ordering may seem insignificant. However, if F represents a large portion of code, it would be preferable to have F placed at the end of the program. In this manner, the instructions in F, that are hardly executed (i.e., that are negligible) compared to some of the other blocks (such as C and D), are given less priority in following block E. Instead, a block that is executed a greater number of times (block C) is placed after block E, thereby keeping the instructions that are executed the greatest number of times in closer proximity to ensure better utilization of the instruction cache system.

Figure 8:
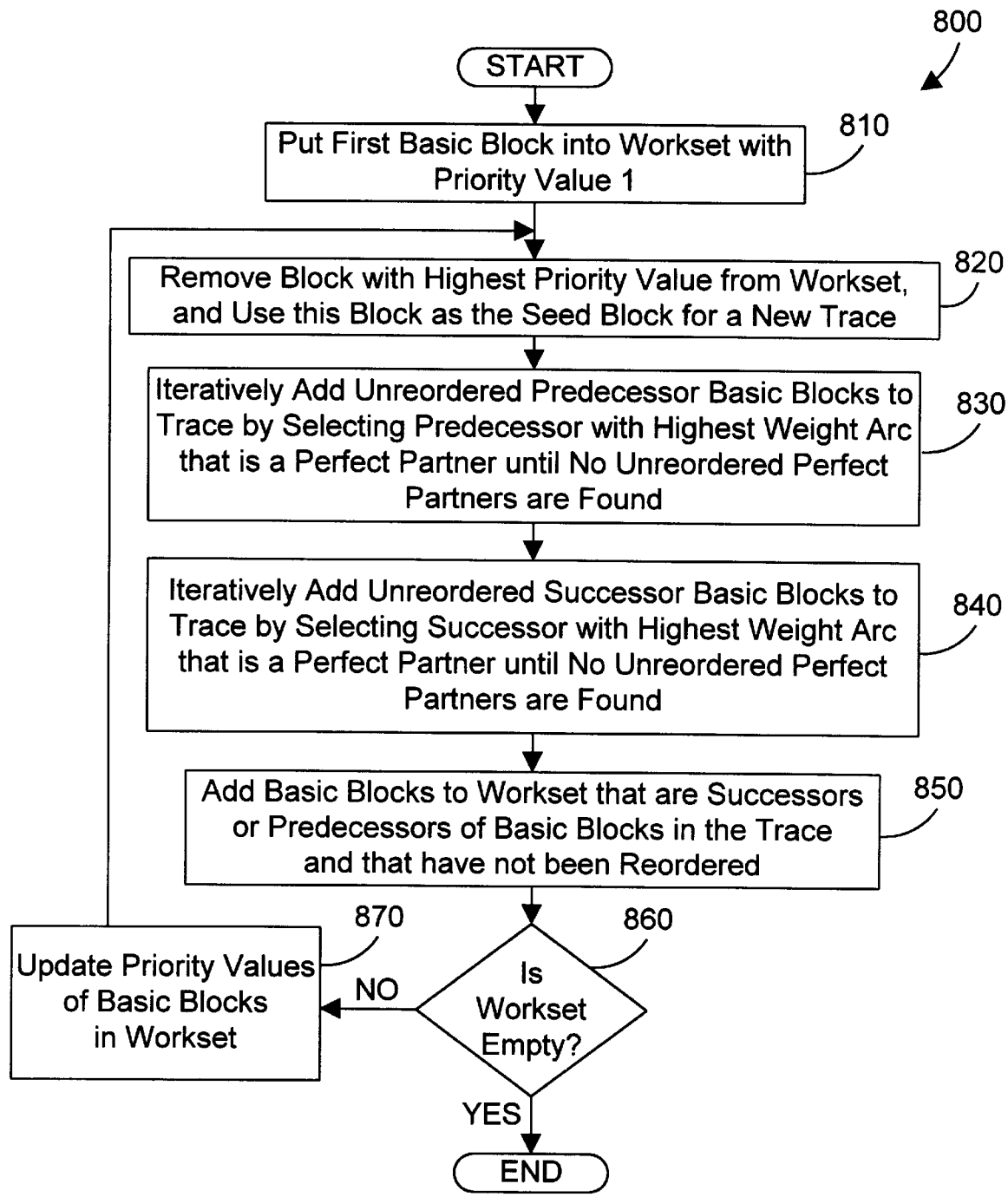
FIG. 8 is a flow diagram of a method in accordance with a second embodiment of the invention.

Referring to FIG. 8, method 800 in accordance with a second embodiment of the present invention includes steps 810, 820, 850, 860, and 870 that are preferably analogous to steps 210, 220, 250, 260, and 270, respectively, of method 200 in FIG. 2. However, these steps may be modified within the scope of the present invention to perform different or additional functions in alternative embodiments. In the second preferred embodiment, the first basic block is put into the workset (step 810) and then added to the trace (step 820). However, the "greediness" of the method 200 is limited in steps 830 and 840. In step 830, unreordered predecessor basic blocks are added to the trace only if they are perfect partners with the appropriate basic block in the trace. In step 840, unreordered successor basic blocks are added to the trace only if they are perfect partners with the appropriate basic block in the trace.

The concept of perfect partners is central to the method of the second embodiment. In essence, an unreordered predecessor basic block may only be added to the trace if it "prefers" the current basic block and vice versa. The unreordered predecessor basic block "prefers" the current basic block if the arc connecting the two is the highest weight arc of all arcs leaving the unreordered predecessor basic block that touch unreordered successor basic blocks. In similar manner, the current basic block "prefers" the unreordered predecessor basic block if the arc connecting the two is the highest weight arc of all arcs entering the current basic block that touch unreordered predecessor basic blocks. If these two basic blocks prefer each other, they are perfect partners, and the unreordered predecessor basic block is added to the trace.

In like manner, an unreordered successor basic block may only be added to the trace if it prefers the current basic block in the trace and vice versa. The unreordered successor basic block prefers the current basic block if the arc connecting the two is the highest weight arc of all arcs entering the unreordered successor basic block that touch unreordered predecessor basic blocks. In similar manner, the current basic block prefers the unreordered successor basic block if the arc connecting the two is the highest weight arc of all arcs leaving the current basic block that touch unreordered successor basic blocks. If these two basic blocks prefer each other, they are perfect partners, and the unreordered successor basic block is added to the trace.

Figure 15:
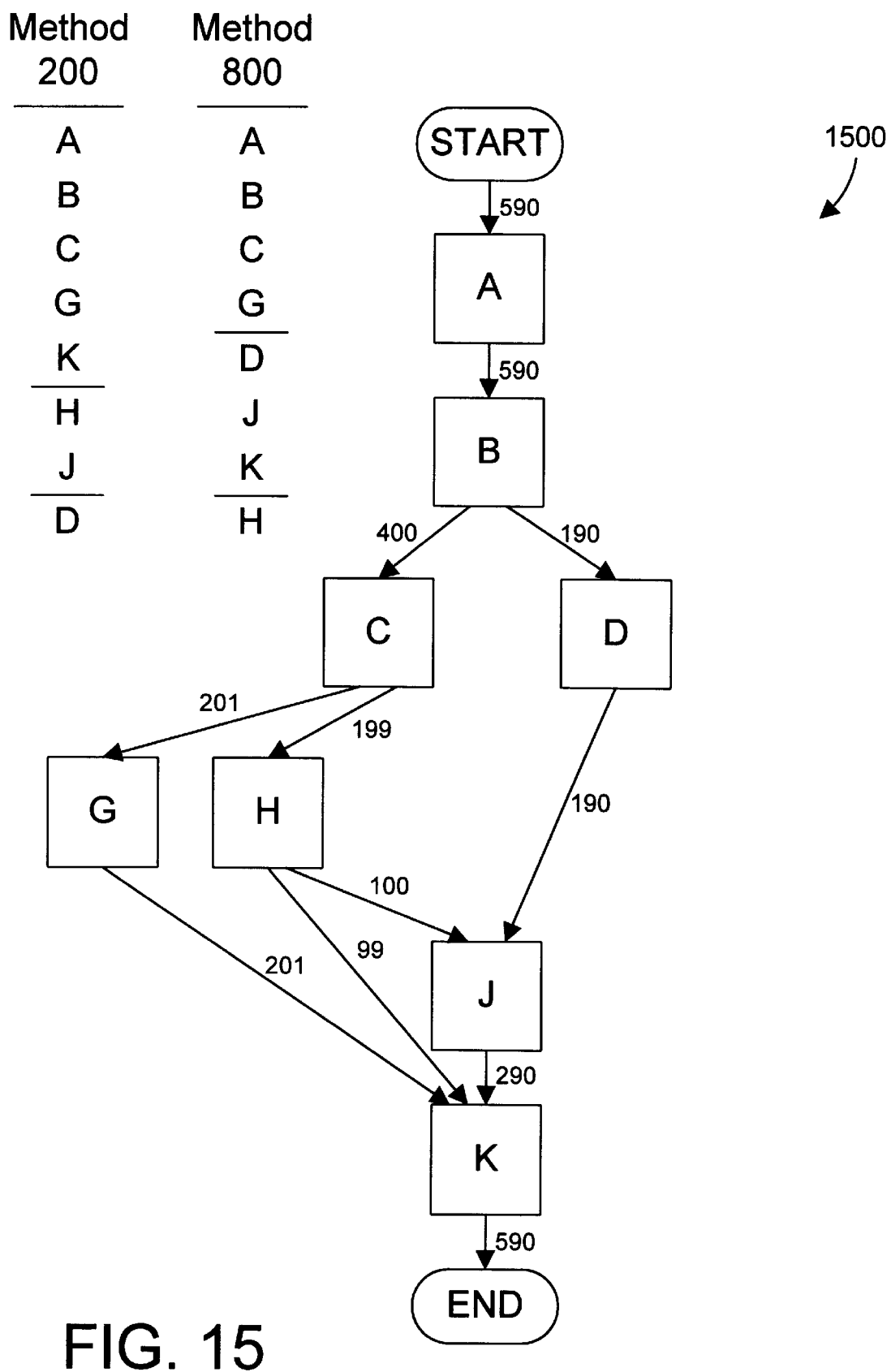
FIG. 15 is a flow diagram of a sample program used to illustrate the differences between the known method of FIG. 2 and the method in accordance with the second embodiment of FIG. 8.

In method 800, step 830 only adds an unreordered predecessor basic block to the trace if it is a perfect partner with the current block in the trace. Likewise, step 840 only adds an unreordered successor block to the trace if it is a perfect partner with the current block in the trace. Method 800 may best be illustrated with reference to a sample program 1500 of FIG. 15 and the flow diagrams of FIGS. 8–10.

Figure 9:
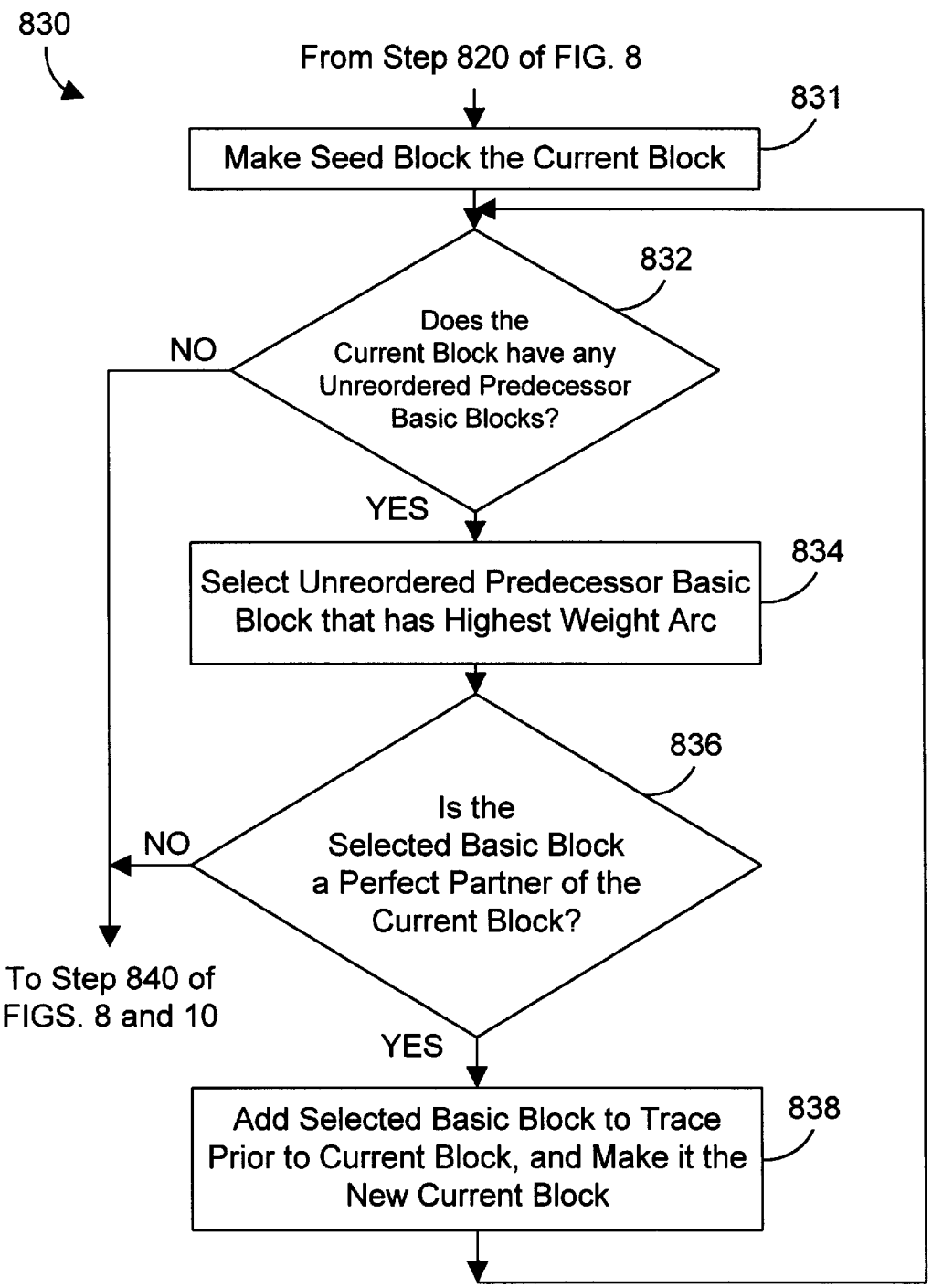
FIG. 9 is a flow diagram showing one detailed implementation of step 830 of FIG. 8.
Figure 10:
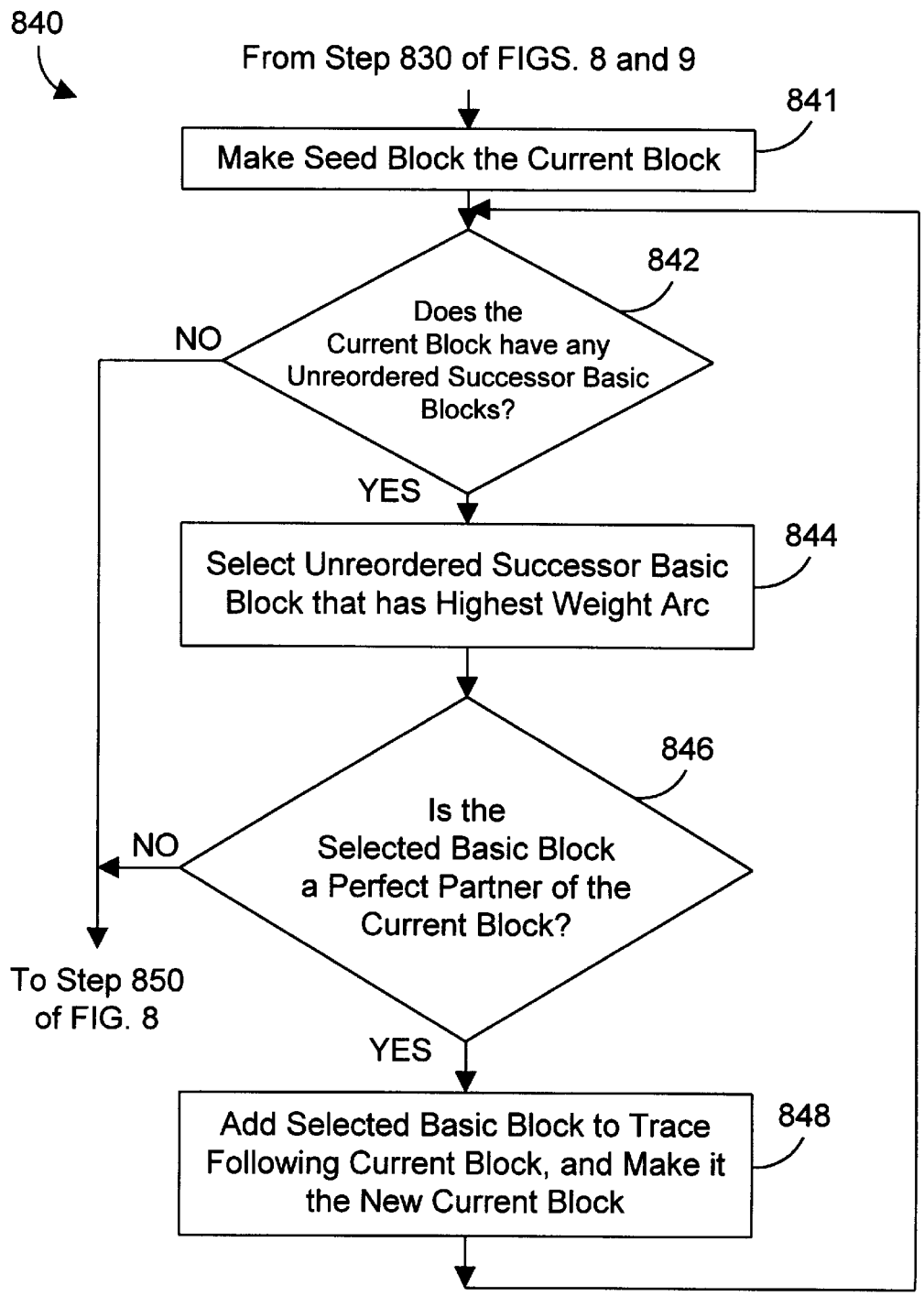
FIG. 10 is a flow diagram showing one detailed implementation of step 840 of FIG. 8.

Step 810 (FIG. 8) puts block A into the workset, and step 820 takes block A from the workset and makes block A the seed block for a new trace. Block A is then made the current block (step 831) (FIG. 9). Next, step 832 determines that there is no unreordered predecessor basic block to block A (step 832=NO), so method 800 proceeds to step 840. Again, block A is made the current block (step 841) (FIG. 10). Step 842 determines that there is one unreordered successor basic block, block B (step 842=YES). Block B is selected in step 844, and step 846 determines whether or not block B is a perfect partner of block A. The two prefer each other (there is only one arc leaving block A and only one arc entering block B), so step 846 is YES and block B is added to the trace (step 848).

Step 842 next determines that block B has two unreordered successor basic blocks, blocks C and D. Step 844 selects block C, the unreordered successor block that has the arc with the highest weight connecting it to block B. Block C is a perfect partner to block B (step 846=YES), so block C is added to the trace (step 848). Block C has two unreordered successor blocks, G and H (step 842=YES). Block G is selected because it has the arc connecting it to block C with the highest weight (step 844). Block G is a perfect partner with block C (step 846=YES), so block G is added to the trace (step 848). At this point there is one unreordered successor basic block, block K (step 842=YES). Block K is selected (step 844). Block K is not a perfect partner to block G because, while G prefers K, K prefers J (step 846=NO). Because block G is not a perfect partner to block K, block K is not added to the trace, and method 800 proceeds to step 850 (FIG. 8).

Step 850 adds blocks D, H and K to the workset. The workset is not empty (step 860=NO), so step 870 assigns priority values as follows: D=190, H=199, K=201. Step 820 takes the block from the workset with the highest priority value, block K, and makes it the seed block for a new trace. Block K is then made the current block (step 831). Step 832 then determines that block K does have two unreordered predecessor basic blocks, blocks H and J (step 832=YES). Next, block J is selected (step 834) because it has the highest weight arc connecting it to block K. Block J is a perfect partner with block K (step 836=YES), so block J is added to the trace as a predecessor of block K.

There are two unreordered predecessor basic blocks for block J, blocks D and H (step 832=YES). Next, block D is selected (step 834) because it has the highest weight arc leaving it. Block D is a perfect partner to block J (step 836=YES), so block D is added to the trace as a predecessor of block J. At this point there are no more unreordered predecessor basic blocks (step 832=NO), so method 800 proceeds to step 840 (FIG. 10).

Block K is then made the current block (step 841). At this point in time, there are no unreordered successor basic blocks to block K (step 842=NO), so method 800 proceeds to step 850 (FIG. 8), which finds no new blocks to add to the workset. The workset is not empty (step 860=NO). Step 870 determines priority values for the workset, giving block H a priority of 398. Block H is then selected as the seed block for a new trace (step 820). Because all blocks have been reordered, step 832 and 842 are both NO, step 850 has no more unreordered basic blocks to put in the workset, and as a result, the workset is empty (step 860). Method 800 then terminates, having determined the order of the basic blocks in sample program 1500 according to the order of the basic blocks in the traces. The resultant block order is A-B-C-G-D-J-K-H, as shown in the Method 800 column of FIG. 15, with the various traces separated by horizontal lines. The block order that results from applying method 200 is shown in the Method 200 column of FIG. 15. The method 800 of adding basic blocks to the trace only if they are perfect partners results in a more favorable ordering of the basic blocks, an ordering that provides better packing of instructions in the instruction cache, as well as fewer executed branches, for the frequently executed secondary path A-B-D-J-K, while having minimal impact on the primary path A-B-C-G-K.

Figure 11:
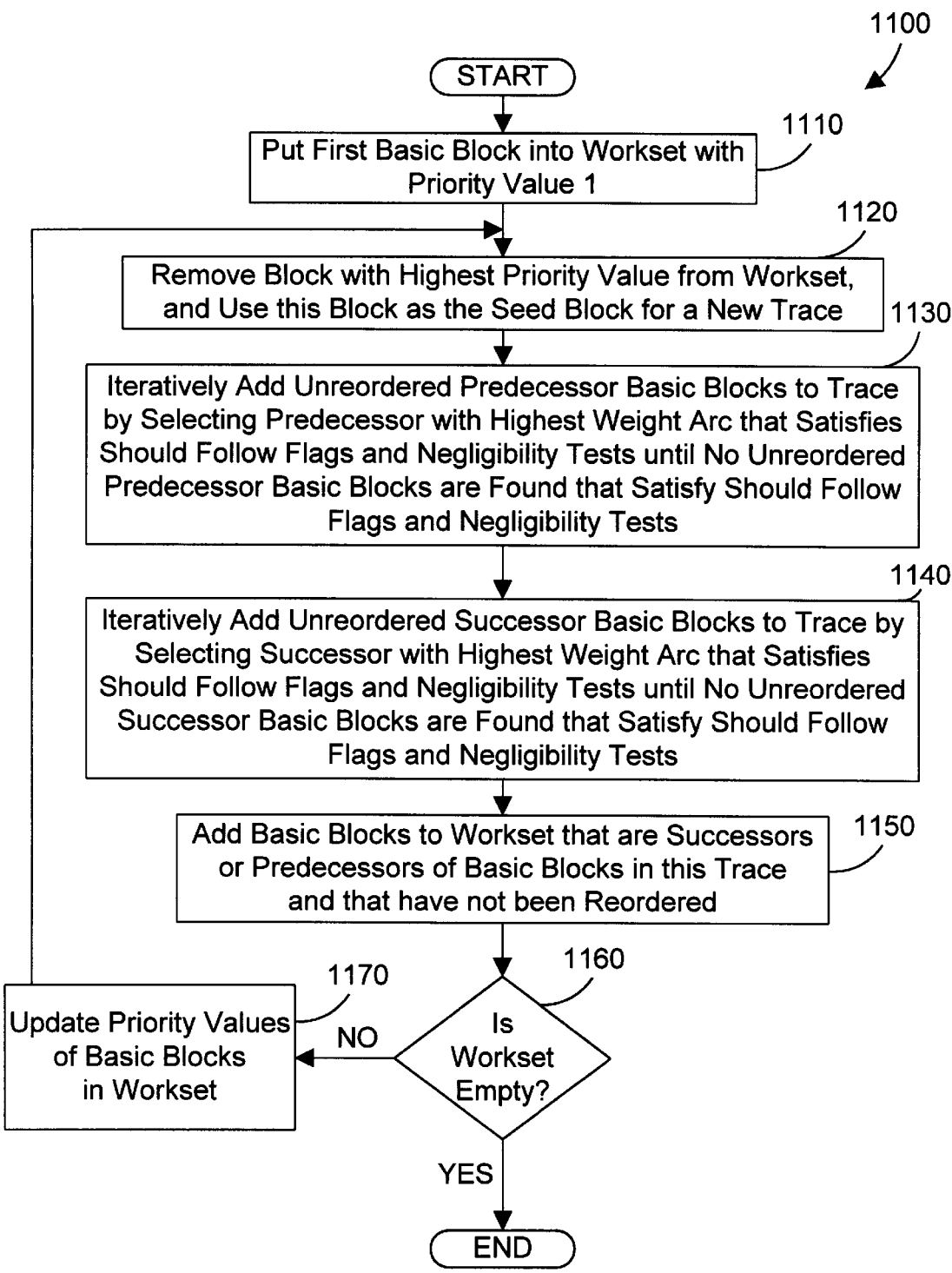
FIG. 11 is a flow diagram of a method in accordance with a third embodiment of the invention.

Referring to FIG. 11, method 1100 in accordance with a third embodiment of the present invention uses the concept of a "should follow" flag in each basic block to indicate when the basic block should follow another basic block. Method 1100 includes steps 1110, 1120, 1150, 1160, and 1170 that are preferably analogous to steps 210, 220, 250, 260, and 270, respectively, of method 200 in FIG. 2. However, these steps may be modified within the scope of the present invention to perform different or additional functions in alternative embodiments. In the third preferred embodiment, the first basic block is put into the workset with priority value 1 (step 1110), and is then selected as the seed block for a new trace (step 1120). However, the "greediness" of the method 200 is limited in steps 1130 and 1140. In step 1130, unreordered predecessor basic blocks are added to the trace only if they satisfy "should follow" and negligibility tests (discussed in detail in reference to FIG. 12). In step 1140, unreordered successor basic blocks are added to the trace only if they satisfy "should follow" and negligibility tests (discussed in detail in reference to FIG. 13).

Figure 12:
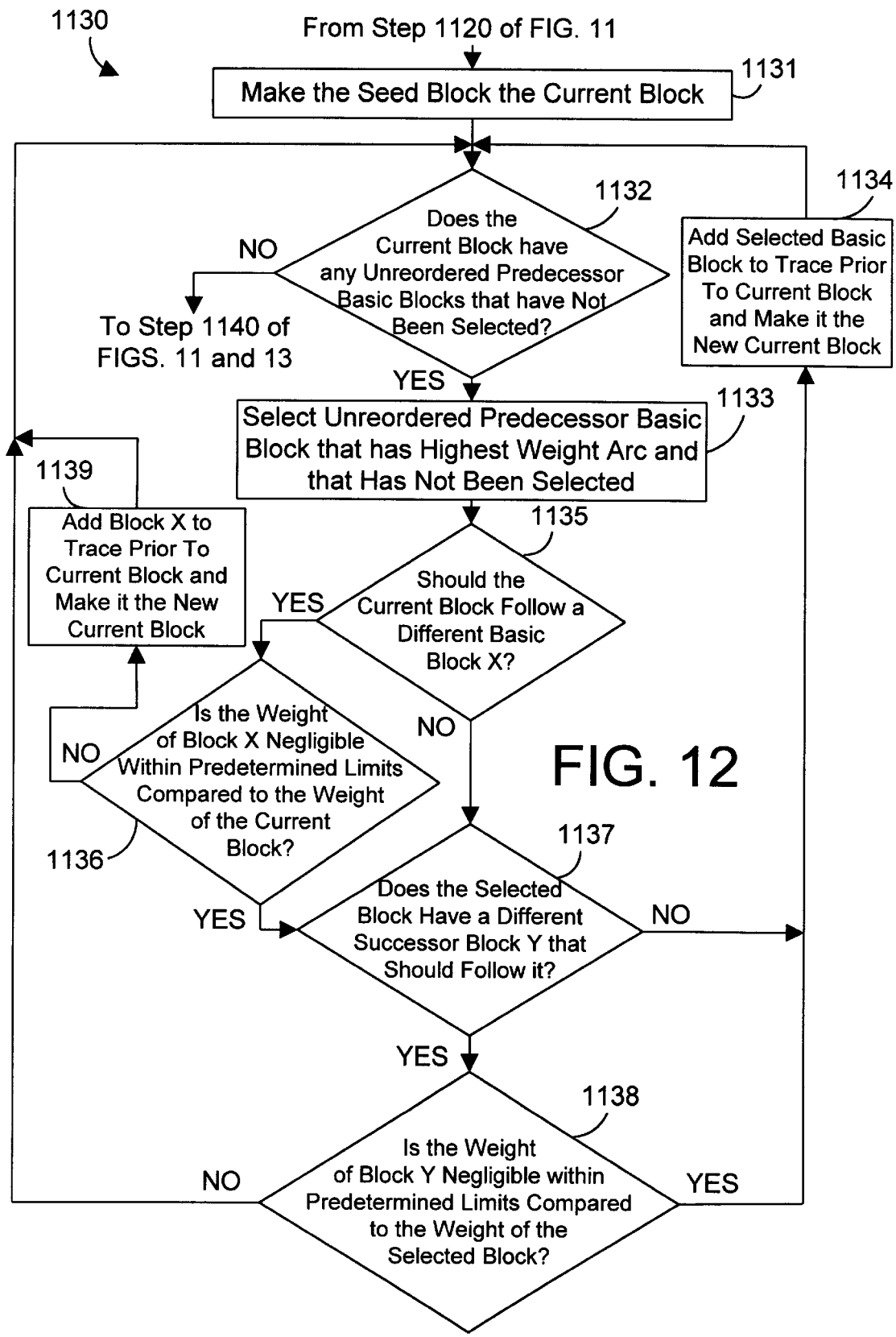
FIG. 12 is a flow diagram showing one detailed implementation of step 1130 of FIG. 11.
Figure 13:
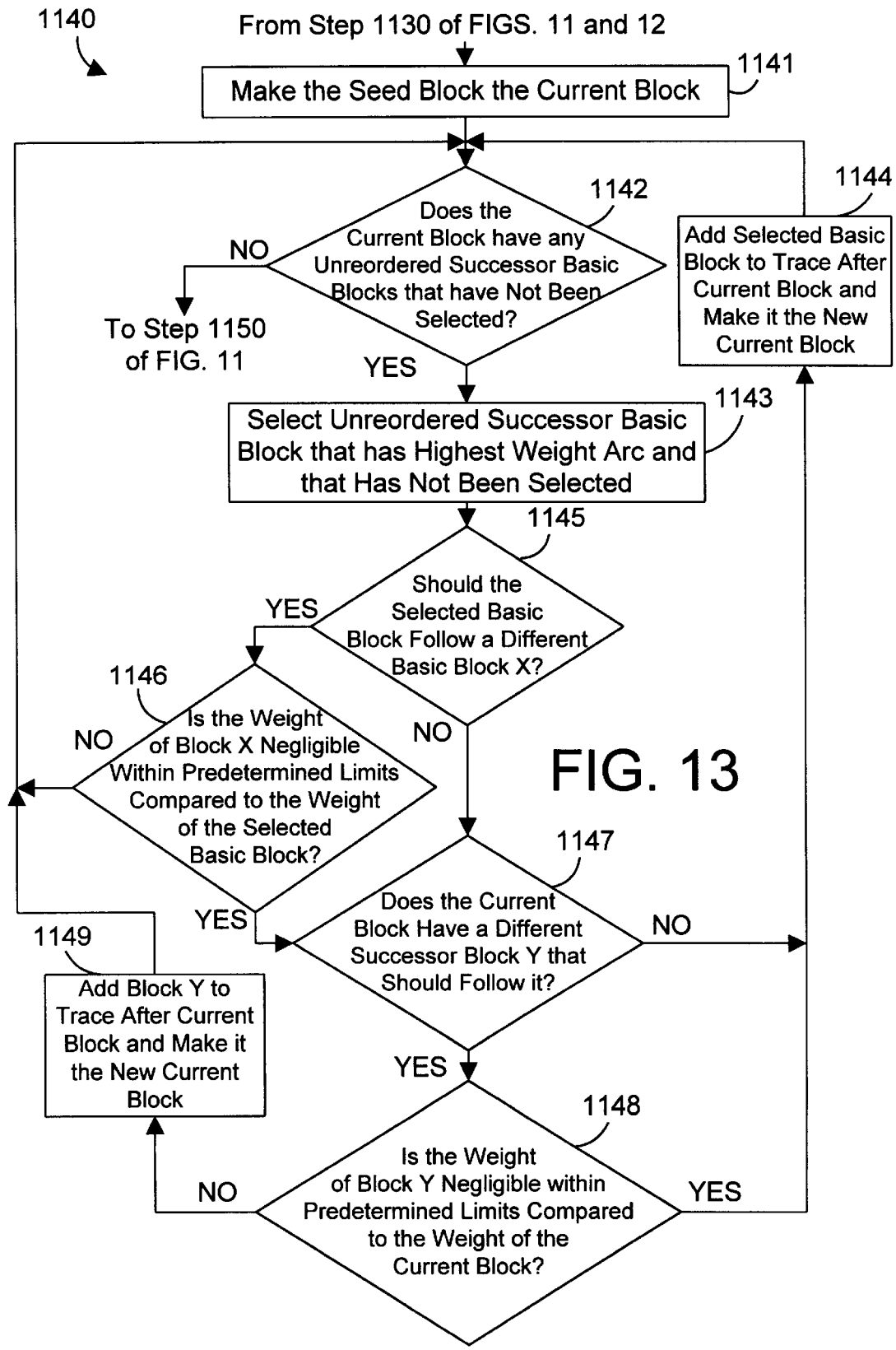
FIG. 13 is a flow diagram showing one detailed implementation of step 1140 of FIG. 11.

Referring to the sample program 1600 of FIG. 16 and the flow diagrams of FIGS. 11–13, method 1100 is discussed below to illustrate the features of method 1100 according to a third preferred embodiment. One goal of providing a "should follow" flag in a basic block is to avoid two back-to-back branches in the computer program. Back-to-back branches may arise when a call instruction is the last instruction in a basic block. The return instruction will generate a branch back to the basic block where the call resides, and an unconditional branch to a different basic block may then result. For example, in the sample program 1600 of FIG. 16, method 200 results in the order A-B-D-C. If a "call X" instruction is the last instruction in block C, the return from the call will be a branch instruction, which will be immediately followed by an unconditional branch to block D.

Back-to-back branches should be avoided because they cause inefficiencies in the instruction prefetch mechanism of many modern processors. The prefetch hardware can generally only look ahead down one branch at a time to decide which instructions to prefetch. If the program branches to one location, and immediately branches to another location, the prefetch mechanism gets behind because it cannot see far enough ahead to prefetch down the second branch path. To avoid this problem in sample program 1600, we need to recognize in our reordering method that block D should follow block C, which will avoid the unconditional branch from block C to block D. For sample program 1600, assume we have implemented a "should follow" flag that is set in block D to indicate that block D should follow block C. Referring to FIGS. 11–13, method 1100 puts block A into the workset with priority value 1 (step 1110), and takes block A out of the workset and assigns A as the seed block for a new trace (step 1120). Block A is then made the current block (step 1131) (FIG. 12). Next, step 1132 determines if the current block has any unreordered predecessor basic blocks that have not been previously selected. Because A is the first basic block in sample program 1600, there are no predecessor blocks of A (step 1132=NO). Method 1100 then proceeds to step 1140 (FIG. 13). Step 1141 again sets the seed block A to be the current block. Blocks B and C are both unreordered successor blocks to A and have not been previously selected (step 1142=YES), and block B is selected (step 1143) because the weight (51) of its arc connecting it to block A is greater than the weight (49) of the arc connecting block C to A. Block B does not have a "should follow" flag set (step 1145=NO). Next, step 1147 determines whether the current block (block A) has a different successor block Y that should follow it. The only other block that follows A is block C, which does not have its "should follow" flag set (step 1147=NO). Thus, block B is added to the trace and selected as the current block (step 1144). Block B has one unreordered successor basic block, block D (step 1142=YES), so block D is selected (step 1143). Block D has its "should follow" flag set to try to follow block C, (not block B), so step 1145 is YES. Next, we must determine whether the weight of block C is negligible compared to the weight of block D (step 1146). Assume that block C is negligible if its weight is less than or equal to ten percent of the weight of block D. The weight of block C (49) is 49% of the weight of block D (100), so the weight of block C is not negligible (step 1146=NO). As a result, block D is not added to the trace.

At this point block B has no more unreordered successor basic blocks (step 1142=NO), so method 1100 proceeds with step 1150 (FIG. 11), which adds blocks C and D to the workset. The workset is not empty (step 1160=NO), so step 1170 updates the priority values of C and D (the blocks in the workset) to C=49 and D=51. Step 1120 selects block D as the seed block since it has the highest priority value in the workset. In step 1130 (FIG. 12), block D is assigned as the current block (step 1131). Block D does have one unreordered predecessor, block C (step 1132=YES), so block C is selected (step 1133). Because the "should follow" flag in block D (the current block) is set to identify block C, block D should follow block C (step 1135=NO and step 1137=NO). As a result, block C is added to the trace before block D, and block C is made the new current block (step 1134). At this point block C has no unreordered predecessor basic blocks (step 1132=NO), so method 1100 proceeds to step 1140 (FIG. 13). Block D is again made the current block (step 1141). Block D has no unreordered successors (step 1142=NO), so method 1100 proceeds to step 1150. No unreordered basic blocks remain, so step 1150 puts nothing into the workset. The workset is empty (step 1160=YES) and method 1100 terminates. The resulting block order is A-B-C-D, which avoids the back-to-back branches that result with prior art method 200 by eliminating the unconditional branch at the end of block C (since block C now flows through to block D).

Figures 16, 17:
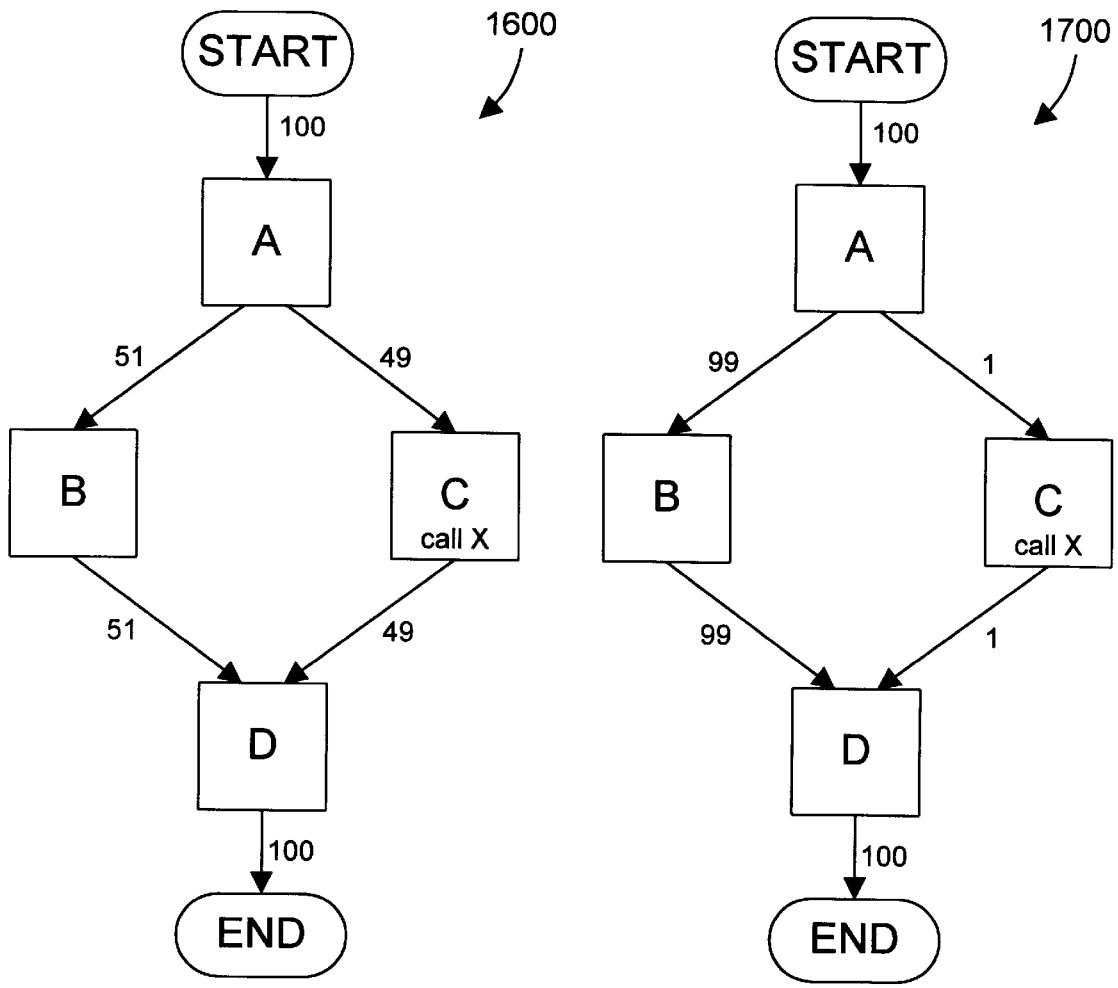
FIG. 16 is a flow diagram of a sample program used to illustrate the differences between the known method of FIG. 2 and the method in accordance with the third embodiment of FIG. 11.
FIG. 17 is a flow diagram of a sample program used to illustrate the differences between the known method of FIG. 2 and the method in accordance with the third embodiment of FIG. 11.

The sample program 1700 of FIG. 17 illustrates why a block that should follow another block is tested for negligibility before adding the applicable block to a trace. Sample program 1700 is the same as sample program 1600 of FIG. 16, except the execution frequencies have changed. As shown in sample program 1700, if the path that contains back-to-back branches is very seldom executed, it may make more sense to not require block D to follow block C. This is the reason the negligibility test is preferably incorporated with the "should follow" flag.

Applying method 100 to sample program 1700 of FIG. 17, assuming a "should follow" flag is set in block D indicating that block D should follow block C, step 1110 puts block A into the workset with a priority value 1, and step 1120 takes block A out of the workset and assigns block A as the seed block for a new trace. In step 1130 (FIG. 12), block A is set to be the current block (step 1131). Block A has no unreordered predecessor basic blocks (step 1132=NO), so method 100 proceeds with step 1140 (FIG. 13). Both B and C are unreordered successor basic blocks of block A (step 1142=YES), and block B is selected (step 1143) for having the highest weight arc connecting it to block A. Block B does not have its "should follow" flag set (step 1145=NO), and block A does not have a different block that should follow it (step 1147=NO), so block B is added to the trace after block A, and block B is made the current block (step 1144).

Block D is an unreordered successor basic block of block B (step 1142=YES), so block D is selected (step 1143). The "should follow" flag in block D is set, but indicates that D should follow block C, not block B (step 1145=YES). Next, block C is tested for negligibility compared to block D. The weight of block C (1) is 1% of the weight of block D (100), so C is negligible (step 1146=YES). Block B is then checked to see if it has a different successor block that should follow it. Block B has no other successor blocks (step 1147=NO), so block D is added to the trace after block B, and block D is made the current block (step 1144). At this point D has no unreordered successor basic blocks (step 1142=NO), so method 1100 proceeds with step 1150 (FIG. 11). Block C is put into the workset (step 1150), so the workset is not empty (step 1160=NO).

Method 1100 assigns block C a priority value of 2 (step 1170), and selects block C as the seed block for a new trace (step 1120). Block C is then assigned as the current block (step 1131). Block C has no unreordered predecessors (step 1132=NO), so method 1100 proceeds to step 1140 (FIG. 13). Again, block C is assigned as the current block (step 1141). Block C has no unreordered successors (step 1142=NO), so method 1100 proceeds to step 1150 (FIG. 11). There are no more blocks to add to the workset in step 1150. The workset is empty (step 1160=YES), and method 1100 ends. Note that, since the weight of block C was negligible with respect to the weight of block D, the "should follow" flag in this simple example provided the same block ordering as method 200 (which produces the same ordering as the prior art), namely A-B-D-C, whereas not using a negligibility test would have produced the inferior ordering A-B-C-D. Combining the concepts of "should follow" with negligibility gives much more power to method 1100 when compared to method 200, and will result in traces that are significantly improved for most non-trivial computer programs.

The apparatus and methods in accordance with the present invention disclosed herein provide a way to reorder portions of a computer program to better optimize the run-time performance of the computer program. This may be done by injecting more intelligence into the decision of when to add a particular portion to the trace. The invention thus provides computer programs that have significant performance enhancements when compared to the prior art.

While the invention has been particularly shown and described with reference to preferred embodiments thereof, it will be understood by those skilled in the art that various changes in form and details may be made therein without departing from the spirit and scope of the invention.

We claim:

1. An apparatus comprising:
   at least one processor;
   a memory coupled to the at least one processor;
   a computer program residing in the memory comprising a plurality of portions joined by a plurality of program paths;
   profile data residing in the memory representing the execution frequency of at least one of the plurality of program paths within the computer program;
   a reordering mechanism residing in the memory and executed by the at least one processor for determining an order for the plurality of portions of the computer program by constructing a plurality of traces, each trace comprising a possible execution path along the plurality of program paths through at least one of the plurality of portions, the reordering mechanism placing the at least one portion in the trace in an order determined by (1) the profile data and (2) at least one reordering method that does not necessarily add to the trace any predecessor portion to the at least one portion in the trace when at least one predecessor portion exists, and that does not necessarily add to the trace any successor portion to the at least one portion in the trace when at least one successor portion exists.

2. The apparatus of claim 1 wherein the reordering mechanism orders the plurality of traces, the reordering mechanism determining the order for the plurality of portions of the computer program from the order of creation of the plurality of traces and the order of the plurality of portions within the plurality of traces.

3. The apparatus of claim 1 wherein each of the plurality of portions of the computer program comprises a basic block.

4. A method for improving execution speed of a computer program on a computer apparatus by reordering a plurality of program portions in a computer program, the method comprising the step of:
   constructing a plurality of traces, each trace comprising at least one of the plurality of portions, the step of constructing each trace comprising the steps of:
      adding a portion to the trace in an order determined by:
         (1) profile data; and
         (2) at least one reordering method that does not necessarily add to the trace any predecessor portion to the at least one portion in the trace when at least one predecessor portion exists, and that does not necessarily add to the trace any successor portion to the at least one portion in the trace when at least one successor portion exists;
   ordering the plurality of traces according to their order of creation; and
   reordering the plurality of portions of the computer program from the order of the plurality of traces and the order of the plurality of portions within the plurality of traces.

5. The method of claim 4 wherein the at least one reordering method comprises the steps of adding predecessor and successor portions to the trace if they are negligible within predetermined limits compared to at least one of the portions in the trace.

6. The method of claim 4 wherein the at least one reordering method comprises not adding a candidate portion to the trace unless the candidate portion is a perfect partner with at least one of the portions in the trace.

7. The method of claim 4 wherein the at least one reordering method comprises not adding an unreordered successor portion to the trace if the unreordered successor portion should follow a portion of the computer program that is different than a portion of the computer program in the trace that identifies the unreordered successor portion as a candidate for reordering and that precedes the unreordered successor portion.

8. The method of claim 7 wherein the unreordered successor portion should follow a portion of the computer program that is different than the portion of the computer program in the trace if the unreordered successor portion is not negligible within predetermined limits compared to the different portion.

9. The method of claim 4 wherein the at least one reordering method comprises not adding an unreordered successor portion to the trace if the portion of the computer program in the trace that identifies the unreordered successor portion as a candidate for reordering and that precedes the unreordered successor portion has a different portion that should follow the portion in the trace, and the different portion is not negligible within predetermined limits compared to the portion in the trace.

10. The method of claim 4 wherein the at least one reordering method does not add an unreordered predecessor portion to the trace if the portion in the trace that identifies the unreordered predecessor as a candidate for reordering and that succeeds the unreordered predecessor portion should follow a different portion of the computer program.

11. The method of claim 10 wherein the different portion should follow the unreordered predecessor portion if the unreordered successor portion is not negligible within predetermined limits compared to the different portion.

12. The method of claim 4 wherein the at least one reordering method does not add an unreordered predecessor portion to the trace if a portion different from the portion in the trace that identifies the unreordered predecessor as a candidate for reordering and that succeeds the unreordered predecessor portion should follow the unreordered predecessor portion and is not negligible within predetermined limits compared to the unreordered predecessor portion.

13. A program product comprising:
   (A) an optimizer, the optimizer reordering a plurality of program portions in a computer program according to profile data, the optimizer comprising:
      a reordering mechanism for determining an order for the plurality of portions of the computer program by constructing a plurality of traces, each trace comprising a possible execution path along a plurality of program paths through at least one of the plurality of portions, the reordering mechanism placing the at least one portion in the trace in an order determined by (1) the profile data and (2) at least one reordering method that does not necessarily add to the trace any predecessor portion to the at least one portion in the trace when at least one predecessor portion exists, and that does not necessarily add to the trace any successor portion to the at least one portion in the trace when at least one successor portion exists; and
   (B) signal bearing media bearing the optimizer.

14. The program product of claim 13 wherein the signal bearing media comprises recordable media.

15. The program product of claim 13 wherein the signal bearing media comprises transmission media.

16. The program product of claim 13 wherein each of the plurality of portions of the computer program comprises a basic block.

17. An apparatus comprising:
   at least one processor;
   a memory coupled to the at least one processor;
   a computer program residing in the memory comprising a plurality of basic blocks joined by a plurality of program paths;
   profile data residing in the memory representing the execution frequency of at least one of the plurality of program paths within the computer program;
   a reordering mechanism residing in the memory and executed by the at least one processor for determining an order for the plurality of basic blocks of the computer program by constructing a plurality of traces, each trace comprising a possible execution path along the plurality of program paths through at least one of the plurality of basic blocks, the reordering mechanism placing the at least one basic block in the trace in an order determined by (1) the profile data and (2) at least one reordering method that does not necessarily add to the trace any predecessor basic block to the at least one basic block in the trace when at least one predecessor basic block exists, and that does not necessarily add to the trace any successor basic block to the at least one basic block in the trace when at least one successor basic block exists;

the reordering mechanism ordering the plurality of traces according to their order of creation;

the reordering mechanism determining the order for the plurality of basic blocks of the computer program from the order of the plurality of traces and the order of the plurality of basic blocks within the plurality of traces.

18. A method for improving execution speed of a computer program on a computer apparatus by reordering a plurality of basic blocks in a computer program, the method comprising the step of:

constructing a plurality of traces, each trace comprising at least one of the plurality of basic blocks, the step of constructing each trace comprising the steps of:
(A) adding a basic block to the trace in an order determined by:
(1) profile data; and
(2) at least one reordering method that does not necessarily add to the trace any predecessor basic block to the basic block in the trace when at least one predecessor basic block exists, and that does not necessarily add to the trace any successor basic block to the basic block in the trace when at least one successor basic block exists;
(B) ordering the plurality of traces according to their order of creation;
(C) reordering the plurality of basic blocks of the computer program from the order of the plurality of traces and the order of the plurality of basic blocks within the plurality of traces.

19. The method of claim 18 wherein the at least one reordering method comprises the steps of adding predecessor and successor basic blocks to the trace if they are negligible within predetermined limits compared to at least one of the basic blocks in the trace.

20. The method of claim 18 wherein the at least one reordering method comprises not adding a candidate basic block to the trace unless the candidate basic block is a perfect partner with at least one of the basic blocks in the trace.

21. The method of claim 18 wherein the at least one reordering method comprises not adding an unreordered successor basic block to the trace if the unreordered successor basic block should follow a basic block of the computer program that is different than a basic block of the computer program in the trace that identifies the unreordered successor basic block as a candidate for reordering and that precedes the unreordered successor basic block.

22. The method of claim 21 wherein the unreordered successor basic block should follow a basic block of the computer program that is different than the basic block in the trace if the unreordered successor basic block is not negligible within predetermined limits compared to the different basic block.

23. The method of claim 18 wherein the at least one reordering method comprises not adding an unreordered successor portion to the trace if the portion of the computer program in the trace that identifies the unreordered successor portion as a candidate for reordering and that precedes the unreordered successor portion has a different portion that should follow the portion in the trace, and the different portion is not negligible within predetermined limits compared to the portion in the trace.

24. The method of claim 18 wherein the at least one reordering method does not add an unreordered predecessor basic block to the trace if the basic block in the trace that identifies the unreordered predecessor basic block as a candidate for reordering and that succeeds the unreordered predecessor basic block should follow a different basic block of the computer program.

25. The method of claim 24 wherein the different basic block should follow the unreordered predecessor basic block if the unreordered successor basic block is not negligible within predetermined limits compared to the different basic block.

26. The method of claim 18 wherein the at least one reordering method does not add an unreordered predecessor portion to the trace if a portion different from the portion in the trace that identifies the unreordered predecessor as a candidate for reordering and that succeeds the unreordered predecessor portion should follow the unreordered predecessor portion and is not negligible within predetermined limits compared to the unreordered predecessor portion.

* * * * *